(12) United States Patent
Bout et al.

(10) Patent No.: US 9,361,413 B1
(45) Date of Patent: Jun. 7, 2016

(54) SYSTEMS AND METHODS FOR SIMULATING CONTACT BETWEEN PHYSICAL OBJECTS

(71) Applicant: MSC.Software Corporation, Santa Ana, CA (US)

(72) Inventors: Adrie Bout, Moerkapelle (NL); Cees Gelten, Dinteloord (NL)

(73) Assignee: MSC.Software Corporation, Newport Beach, CA (US)

(*) Notice: Subject to any disclaimer, the term of this patent is extended or adjusted under 35 U.S.C. 154(b) by 350 days.

(21) Appl. No.: 13/625,807

(22) Filed: Sep. 24, 2012

(51) Int. Cl.
G06F 17/50 (2006.01)

(52) U.S. Cl.
CPC ........ G06F 17/5018 (2013.01); G06F 17/5004 (2013.01)

(58) Field of Classification Search
CPC .................. G06F 17/5018; G06F 2217/80
USPC ............................................................ 703/1
See application file for complete search history.

(56) References Cited

U.S. PATENT DOCUMENTS

| 7,024,342 | B1* | 4/2006 | Waite et al. | 703/6 |
| 7,987,073 | B2* | 7/2011 | Washizawa | 703/2 |
| 8,180,605 | B1* | 5/2012 | Zhu | 703/2 |
| 8,209,157 | B2* | 6/2012 | Hallquist | 703/2 |
| 8,355,893 | B2* | 1/2013 | Suresh et al. | 703/1 |
| 2002/0112548 | A1* | 8/2002 | Dong et al. | 73/850 |

* cited by examiner

Primary Examiner — Aniss Chad
(74) Attorney, Agent, or Firm — Foley & Lardner LLP

(57) ABSTRACT

The method generates a simulated object represented by finite elements each comprising two or more nodes that represent a first physical object, the first simulated object comprising a plurality of segments placed adjacent to each other to form a surface of the first simulated object. The method further includes generating a second simulated object. The method determines the distance between individual segments of the first simulated object and the plurality of segments of the second simulated object. The method determines a stiffness matrix and force vectors for the at least one segment of the first simulated object that is in contact with at least one segment of the second simulated object. The method transforms the stiffness matrix and the force vector from the segments to determine a stiffness matrix and a force vector on the two or more nodes of the finite element representation of the physical objects.

20 Claims, 22 Drawing Sheets

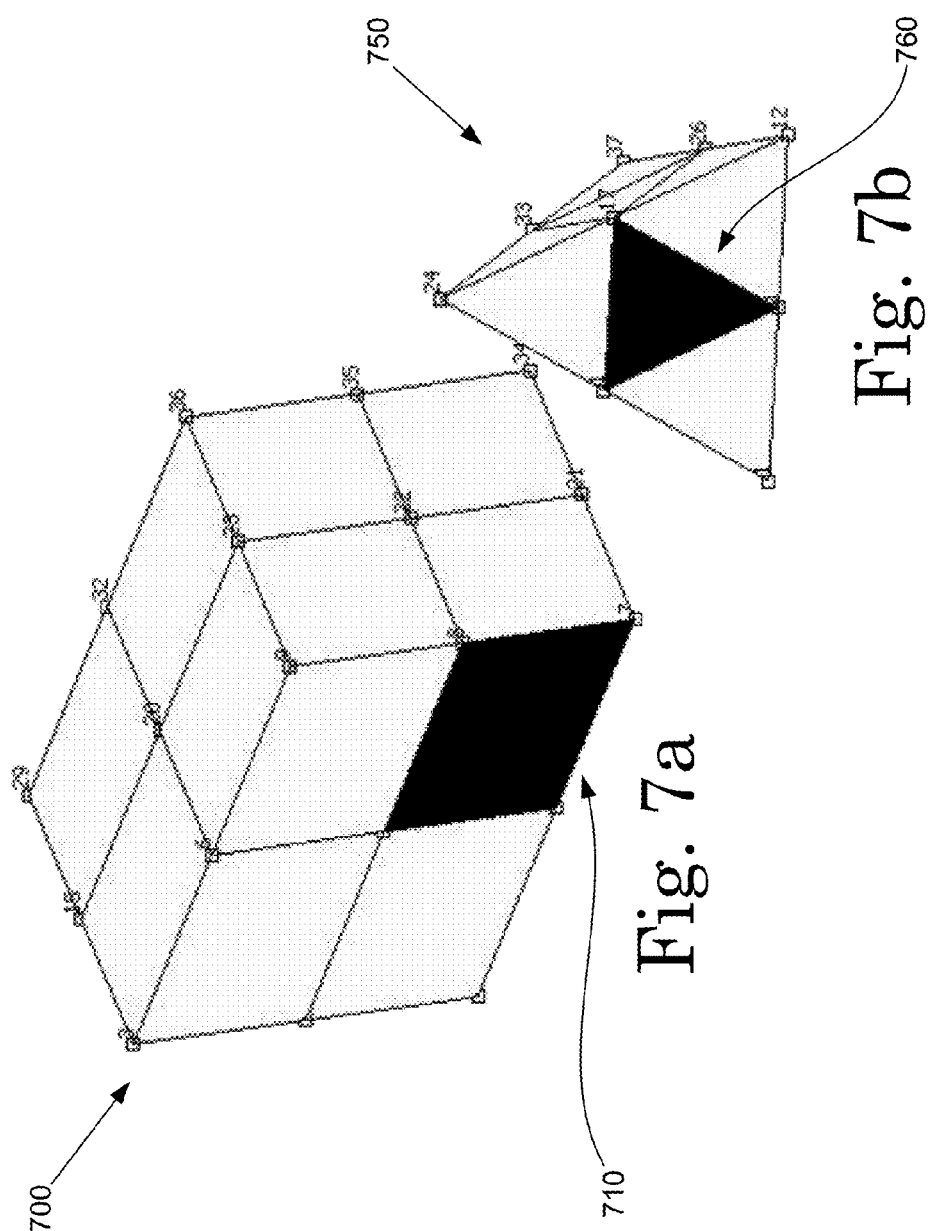

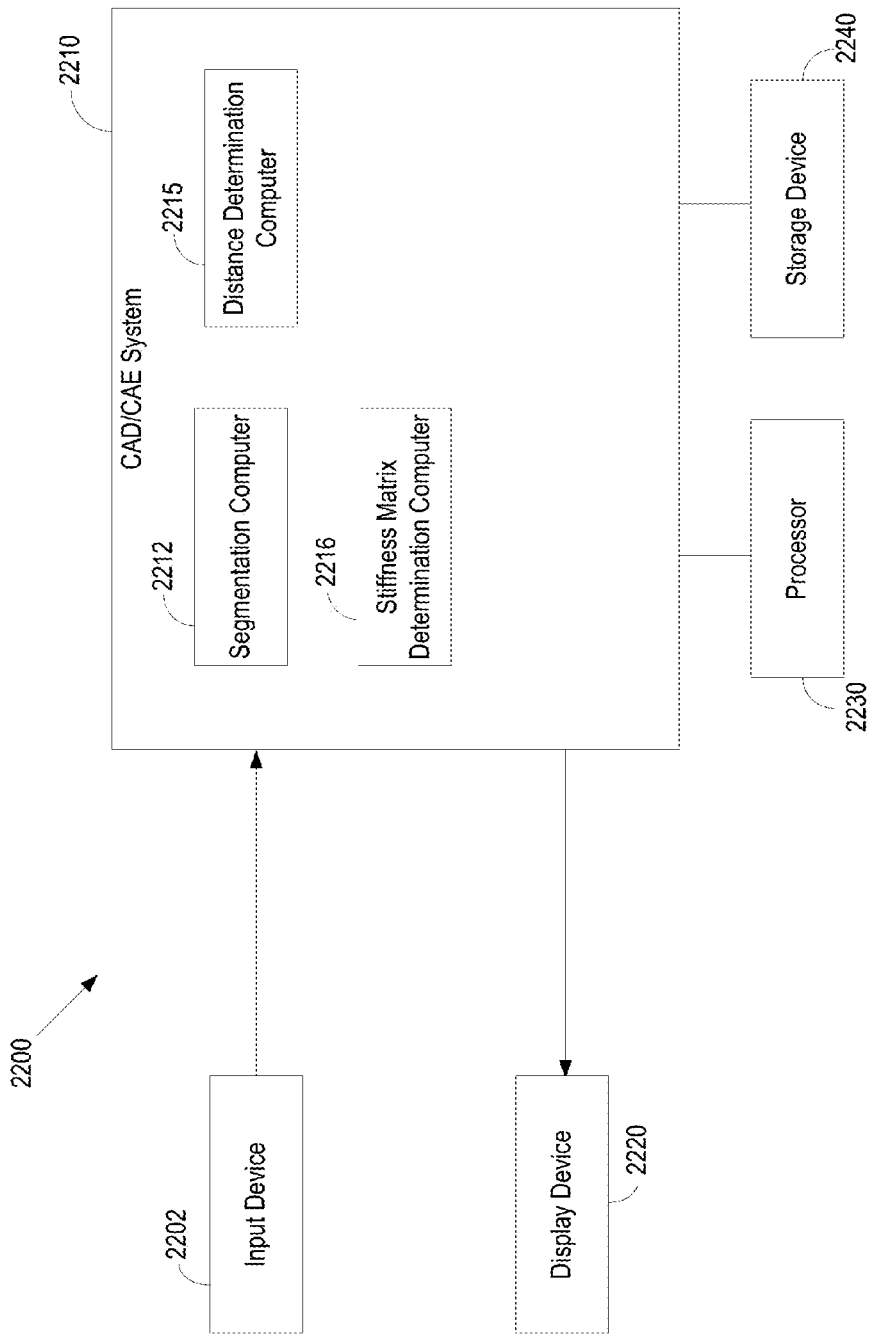

SYSTEMS AND METHODS FOR SIMULATING CONTACT BETWEEN PHYSICAL OBJECTS

BACKGROUND

Manufacturing complex systems and products usually include creating computer-aided design models and conducting numerical tests on the models to determine their behavior. Generating a functional model is a time-consuming process and reducing the amount of time for creating a model and performing the simulation is beneficial to any product manufacturer.

During the computer aided design (CAD) and/or computer-aided engineering (CAE) geometry modeling process, a user may wish to determine how two or more shapes or bodies may interact with each other under external loads as well as their resultant behavior.

SUMMARY OF THE DISCLOSURE

Embodiments of the methods and systems described herein perform simulation of structures such as pipes, beams, etc. to capture their behavior when they are in contact with each other or when they are in contact with either rigid or deformable bodies using the Finite Element Method (FEM). The objective of the numerical simulations is to determine the deformed geometry, the reaction or contact forces between parts, the transfer of state quantities (temperature, current, etc) and the strains and stresses in the part to ensure safe, reliable and optimal part design. Pipes and beams and similar long and slender structures are used in a variety of structures, such as but not limited to, Civil Engineering (Steel, Concrete and Wood Structures), Aerospace Applications (spars and struts in the wing and fuselage), Oil Industry (drilling and transportation), Automotive (bowden cable, wire harnesses), Energy Industry (piping systems, heat exchange systems, cables), Biomedical (stents, catheters), Materials Industry (woven composites, fabrics). Many of these applications require high levels of accuracy of solutions for safety of a properly designed system. High levels of accuracy can require more computational time and power or decreased computational efficiency.

Embodiments of methods include generating a first simulated object represented by one-dimensional beam finite elements, each of the finite elements comprising two or more nodes that represent a first physical object, the first simulated object comprising a plurality of segments placed adjacent to each other to form a surface of the first simulated object. The method further includes generating a second simulated object that represents a second physical object, the second simulated object comprising a plurality of segments placed adjacent to each other to form a surface the second simulated object. The method includes determining the distances between individual segments of the first simulated object and the plurality of segments of the second simulated object. The method determines whether contact exists based upon the distances. Upon a determination that contact exists the method also calculates a stiffness matrix and force vectors for at least one segment of the first simulated object that is in contact with at least one segment of the second simulated object. The method includes converting the stiffness matrix and the force vector to determine a stiffness matrix and a force vector on the two or more nodes.

Embodiments of the system includes a CAD/CAE computer system configured to generate a first simulated object represented by finite elements each comprising two or more nodes that represent a first physical object, the first simulated object comprising a plurality of segments placed adjacent to each other to form a surface of the first simulated object. The CAD/CAE computer system is configured to generate a second simulated object that represents a second physical object, the second simulated object comprising a plurality of segments placed adjacent to each other to form a surface of the second simulated object. A distance determination computer module is configured to determine the distance between individual segments of the first simulated object and the plurality of segments of either the first or the second simulated object. A stiffness matrix determination computer module is configured to determine a stiffness matrix and force vectors for at least one segment of the first simulated object that is in contact with at least one segment of the second simulated object and the CAD/CAE system configured to convert the stiffness matrix and the force vector from the segments to determine a stiffness matrix and a force vector for the two or more nodes of the finite element representation of the physical objects.

Embodiments of systems and method for simulating contact between physical objects may be used for various types of systems. For example, mechanical systems, heat transfer systems, or electro-mechanical systems may be implemented using the embodiments of systems and method for simulating contact between physical objects. In an example embodiment, all systems of cars, airplanes, wiring/cabling, piping, or heat exchanges may be simulated by the embodiments of the interactive simulation and solver system.

BRIEF DESCRIPTION

FIGS. 7a and 7b are schematic drawings showing an example representations of two different objects in a three dimensional forms.

FIG. 22 is schematic block diagram of a computer system in accordance with an exemplary embodiment.

DETAILED DESCRIPTION

Figure 1B:
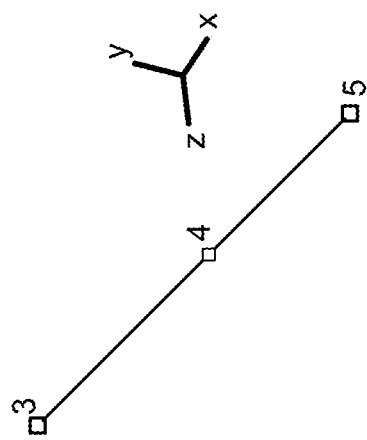
FIGS. 1a and 1b are schematic drawings showing representations of a two-node and three-node beam finite element.
Figure 1A:
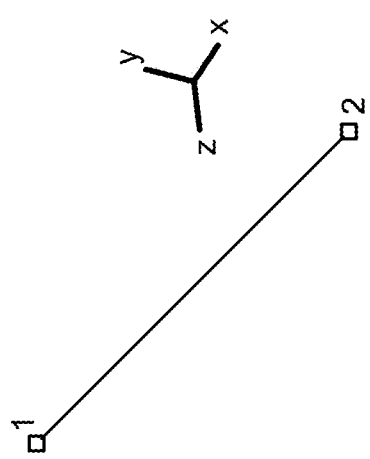

The numerical simulation of beams and pipes are performed using three dimensional beam (3-D) elements in one embodiment. These elements as represented in FIGS. 1a and 1b and are geometrically represented by either two or three nodes (e.g., nodes 1, 2, or 3), and these nodes in the finite element sense are described by their three coordinate positions X, Y and Z. Each node in FIG. 1a has six degrees of freedom Ux, Uy, Uz, θx, θy, and θz. In certain formulations an additional degree of freedom representing the twist is also represented. The numerical behavior of these beams or pipes is governed by their shape functions. The technique described below is suitable for all three dimensional beam, pipe or other elements. Furthermore, these three dimensional representations are often simplified to represent two dimensional (2-D) beam or shell behavior. A user may simulate contact between two objects by using a computer-aided design (CAD) geometry for use in computer-aided engineering (CAE) modeling operations. The modeling operations include, but are not limited to determining a point of contact between objects in one embodiment. A user may apply external loads, prescribed motion, gravity, temperature or other external excitation on the objects.

Figure 2:
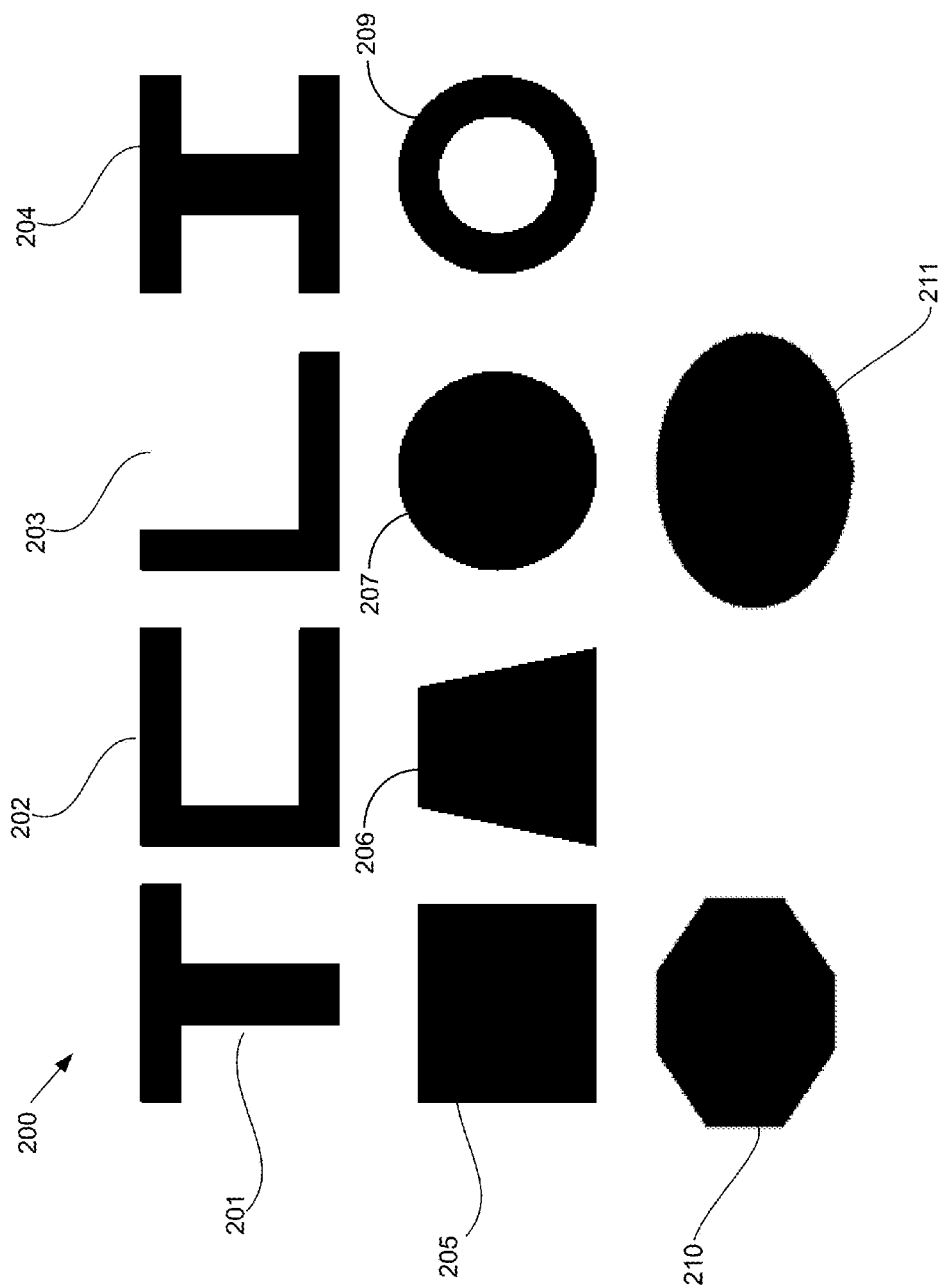
FIG. 2 is a drawing of a set of object cross-sections.

FIG. 2 shows a typical set of object cross-sections. The objects may be a beam, pipe or shell cross-section. The objects may be a beam or pipe cross-section. An important consideration on the modeling of beam and pipe elements is the cross sectional geometry. The long slender structures typically have beam cross-sections 200 shown in FIG. 2 and these are typically called standard sections. The embodiments of the systems and methods described here are not limited to the geometry of the sections shown in FIG. 2. FIG. 2 shows beam sections, such as but not limited to T 201, channel 202, L 203, I 204, rectangular 205, trapezoid 206, solid circular 207, pipe 208, octagonal 209, elliptical 210 and the like.

Figure 3:
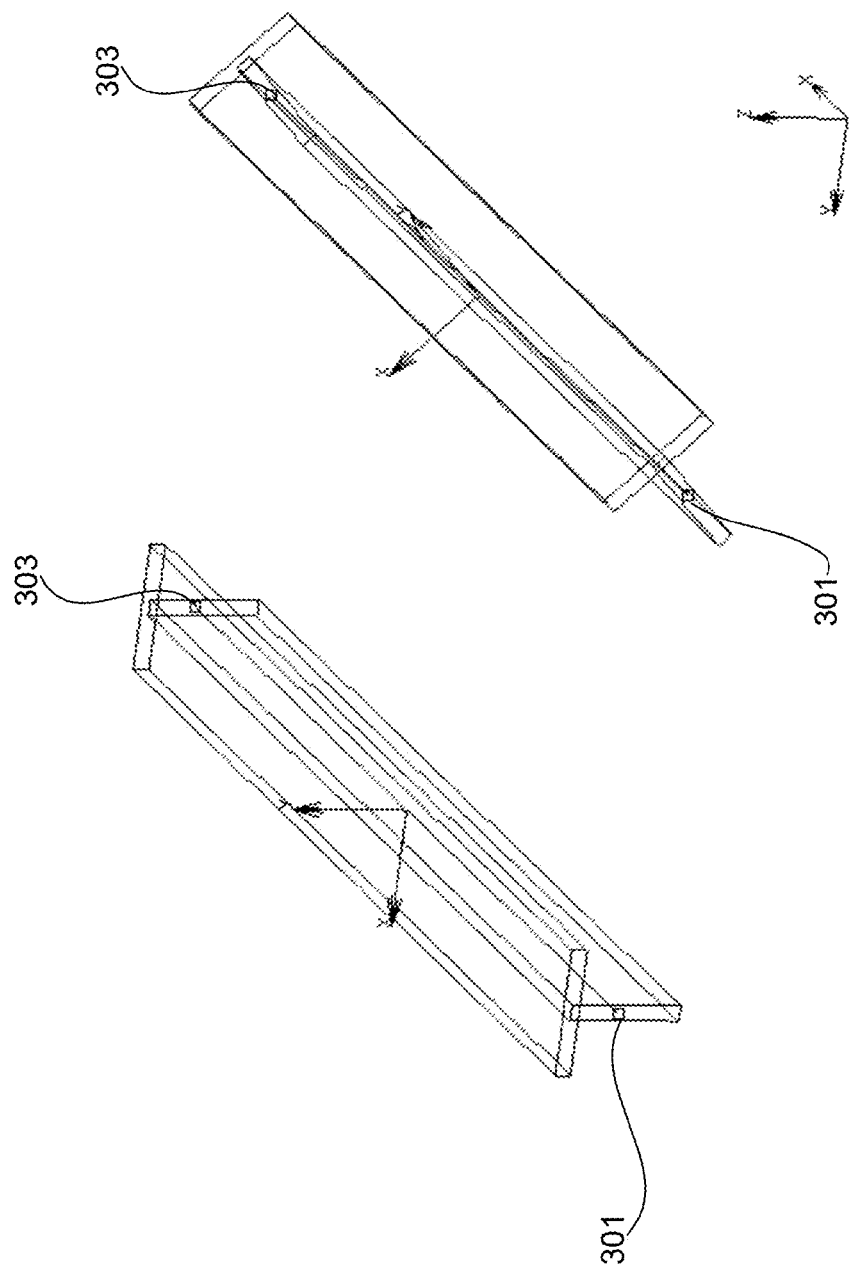
FIG. 3a is a schematic perspective view drawing illustrating the orientation of a beam when the local y axis of the beam is in the global z-y plane and parallel to global z axis.
FIG. 3b is a schematic perspective view drawing illustrating the orientation of a typical beam when the local y axis of the beam is in the global z-y and rotated by 45 degrees.

FIGS. 3a and 3b shows the modeling of beam or pipe elements that include a definition of the cross-section orientation of the cross section with respect to the length and the global coordinate system (shown as x, y, and z). For each element along the part there is an orientation VE which is a directional cosine with respect to the global coordinate system. At the nodal points 301 and 303 there may be multiple orientations based upon the elements that are connected to the nodal points 301 and 303. The orientation of the beam cross section is used in the contact analysis.

Figure 4:
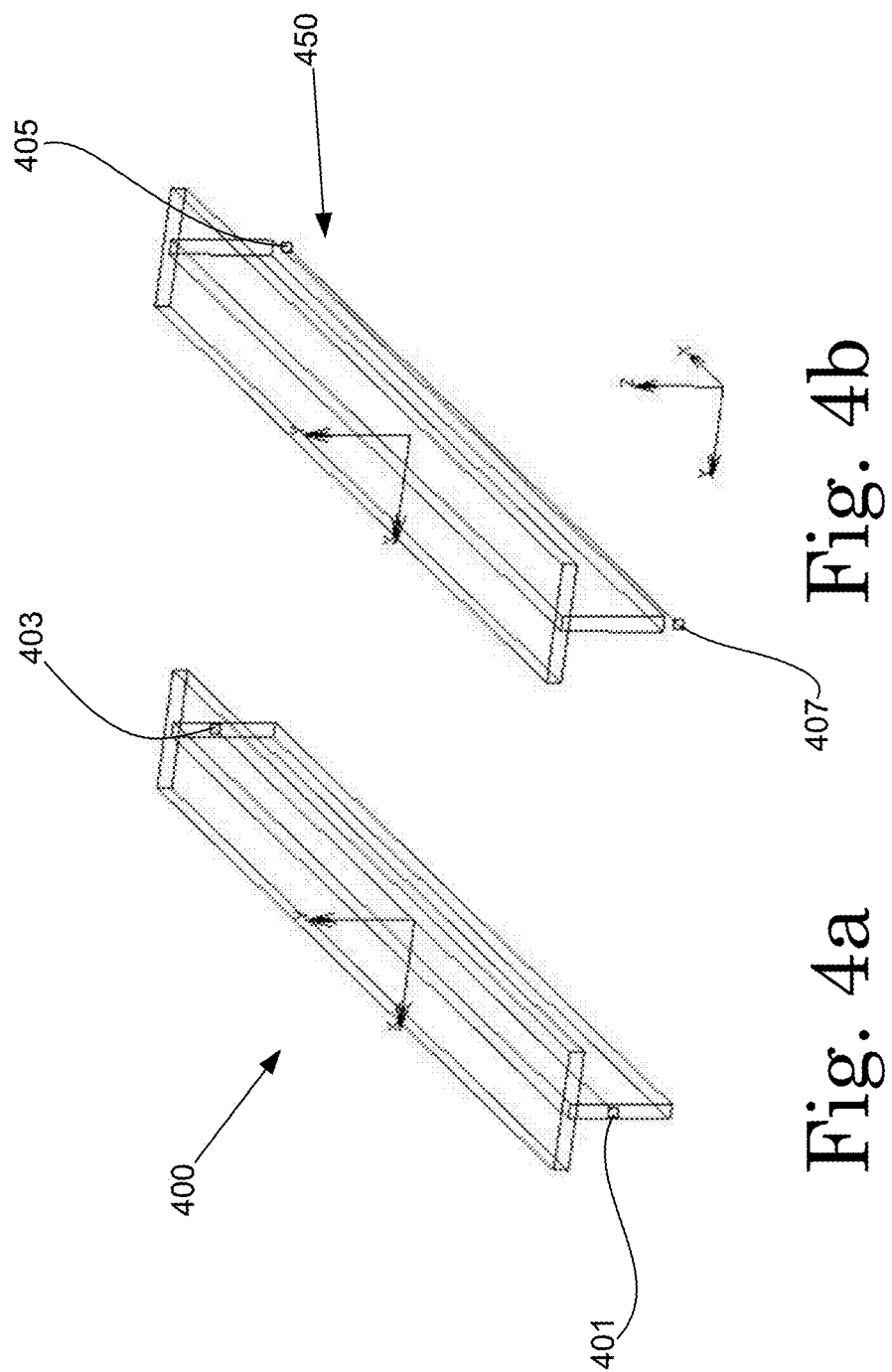
FIG. 4a is a schematic perspective view drawing showing T beam that has the nodal location at the local origin of the beam.
FIG. 4b is a schematic perspective view drawing showing a T beam that has the nodal location of the beam offset from the local orientation of the beam.

FIG. 4a shows a T beam 400 that has a central axial dimension that connects the nodes 401 and 403. FIG. 4b shows a T beam 450 that has a lower axial dimension that connects the nodes 405 and 407. The beam offset represents the distance between the beam origin (usually the shear center) and the nodal coordinate position. Additionally, the geometric offset is utilized to construct the geometric representation of the contact surfaces. As shown in FIGS. 4a and 4b, the physical location of the beam is used in the subsequent calculation. In one embodiment, the geometric representation used for contact will take into account all four of these aspects of the beam, the coordinate position of nodes of beam, beam cross section definition, cross section orientation and beam offsets.

Figure 5:
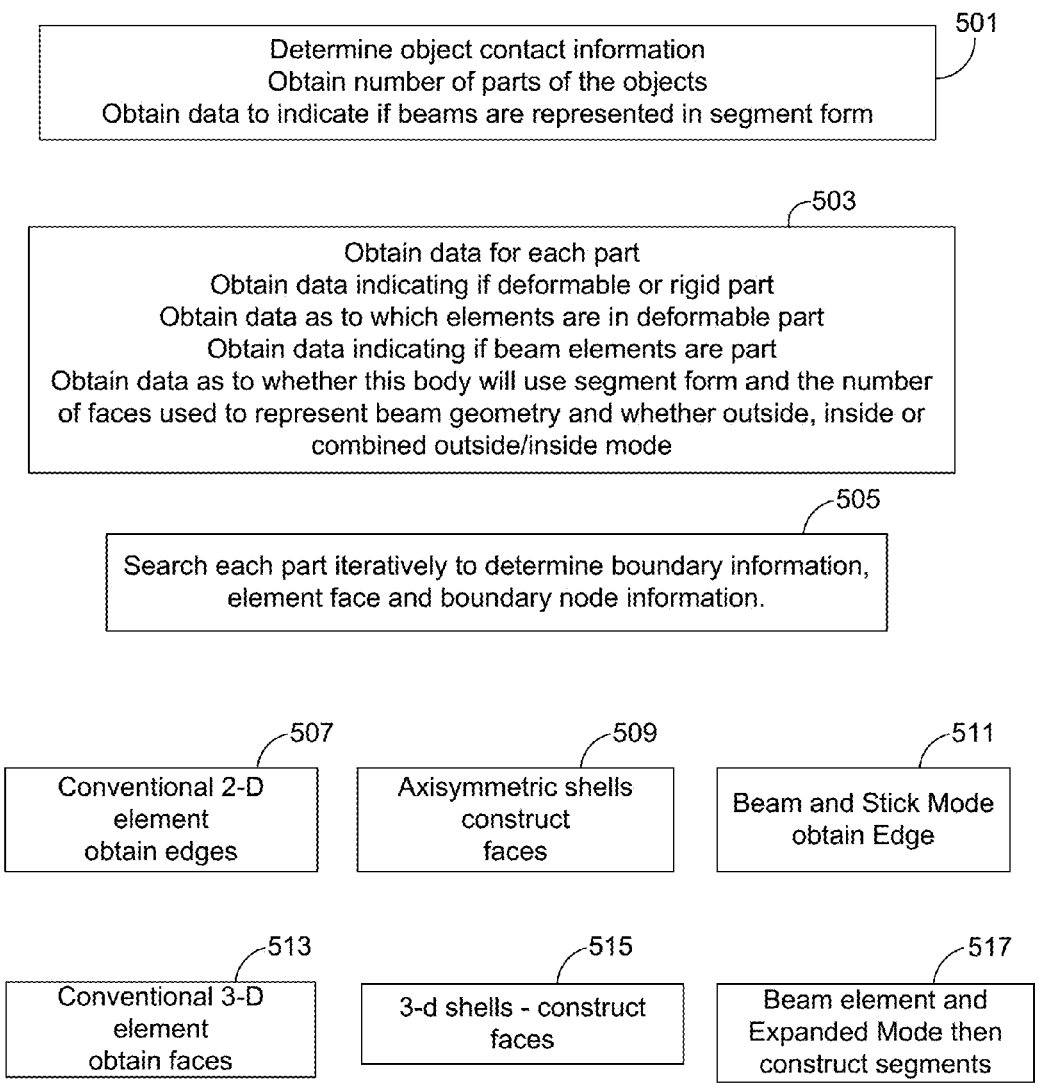
FIG. 5 is a flow diagram illustrating a process that may be implemented using a computer system with a processor coupled to a non-transitory storage medium in accordance with an exemplary embodiment.

FIG. 5 illustrates a process that may be implemented using a computer system with a processor coupled to a non-transitory storage medium. At block 501, the system may determine contact information for objects that are being simulated by using, for example, the distance formula. Also at block 501, the system obtains the number of parts of the objects. In one example the objects may be colliding cars with a plurality of parts. Next, at block 501 the system determines whether a beam is represented in the CAD tool environment with a plurality of segments.

At block 503, data regarding each part of the object may be obtained. The data may indicate whether a part is deformable or rigid. The data may be searched to indicate the deformable parts. The system can determine if the part is represented in a segment form and the number of faces used to represent the part and whether outside, inside or combined outside/inside mode is being used to represent the part. At block 505, the system can search each part iteratively to determine boundary information, element face and boundary node information for various parts. Based on the determining the way a part is represented in the figure, the system determines edges, faces or segments. An edge is a line that connects two nodes that represents the beam or pipe element or is on the perimeter of the element. The contact edges are the collection of edges that enclose an object. A face is a region that bounds three or more nodes on the perimeter of the element. The contact faces are the collection of faces that enclose the volume of an object. A segment is a bounded region that represents where contact may occur. For example, at block 507, when a part is represented as a two dimensional part, the information regarding the edges of the part is determined. At block 509, when a part is an axisymmetric shell, the faces of the shell are constructed. At block 511, when the part is represented as a beam and the edges of the part are obtained. At block 513, when the part is represented in a three dimensional part, the faces of the three dimensional part are obtained. At block 515, the part is detected to be represented as a three dimensional shell, the faces of the three dimensional shell are constructed. At block 517, if the part is represented as a beam element, then the part may be represented in an expanded mode that comprises segments that combine to make the beam element.

Figure 6B:
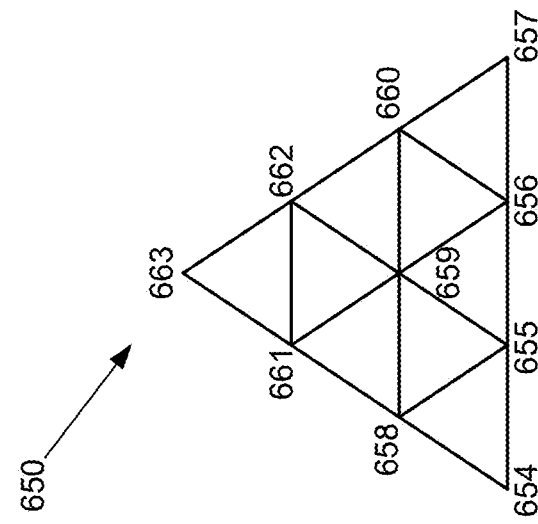
FIGS. 6a and 6b are schematic drawings showing example representations of two different objects in a two dimensional forms.
Figure 6A:
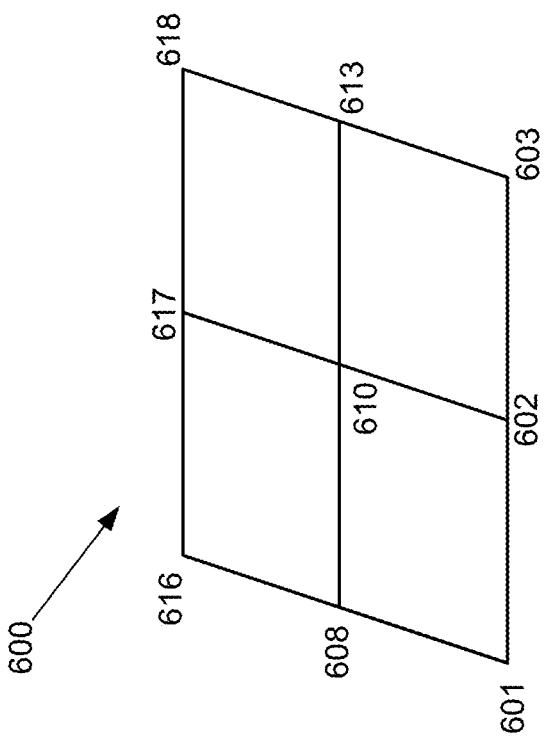

FIGS. 6a and 6b show an example representation of two different objects 600 and 650 in a two dimensional form. In FIG. 6a a two dimensional representation of a portion of an object 600 is shown. Each node 601-618 is associated with one or more quadrilateral elements is numbered within the portion of the object in one embodiment. The node pairs 601-602, 602-603, 603-613, 613-618, 610-613, 618-617, 617-616, and 608-610, and are connected by edges. FIG. 6b is a two dimensional representation using triangular elements. Each node 654-663 is associated with one or more elements is numbered within the object 650 in FIG. 6b in one embodiment. The nodes 654-655, 655-656, 656-657, 657-660, 659-660, 659-658, 660-662, 662-661, 662-663, and 661-663 are connected by edges.

FIGS. 7a and 7b show an example representation of two different objects 700 and 750 in a three dimensional representation. In FIG. 7a, a surface 710 is highlighted surrounded by 4 nodes (4, 5, 7 and 8). FIG. 7b shows a highlighted surface 760 on the object 750 shown in three dimensional form. The highlighted portions of the objects 700 and 750 shown in FIGS. 7a and 7b may be referred to as segments and the contact between the segments may be determined using the methods described in FIG. 5.

Figure 8:
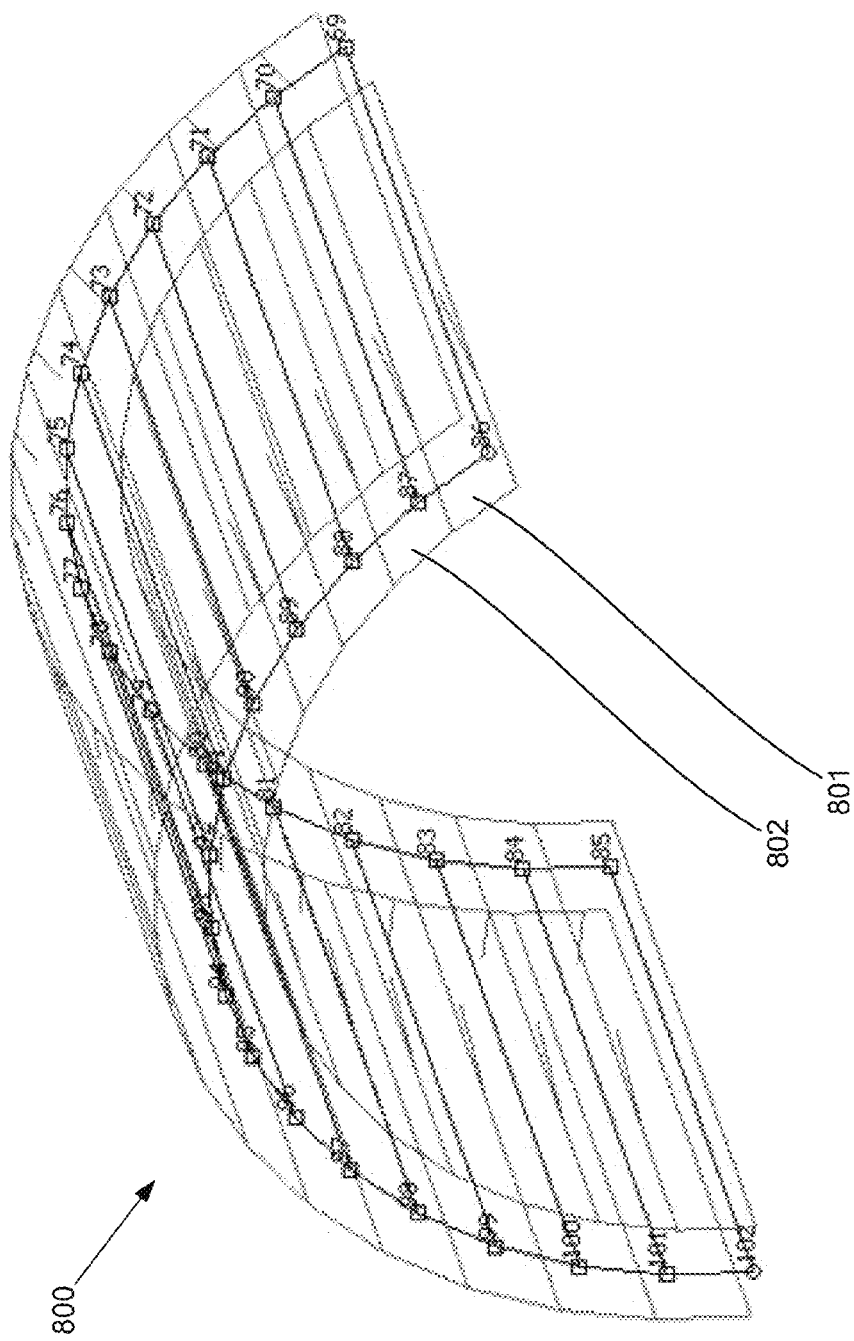
FIG. 8 is a schematic drawing showing a three dimensional shell representation of a curved object.

FIG. 8 shows a three dimensional shell representation of a curved object 800. The segments 801, 802 and so on may be based on a projection of the mid-surface of the shell based upon the surface normal, the thickness of the shell and the shell offset. The three dimensional shell shows the nodes 69 through 102 that form the mid-surface that is divided into a plurality of segments.

Figure 9:
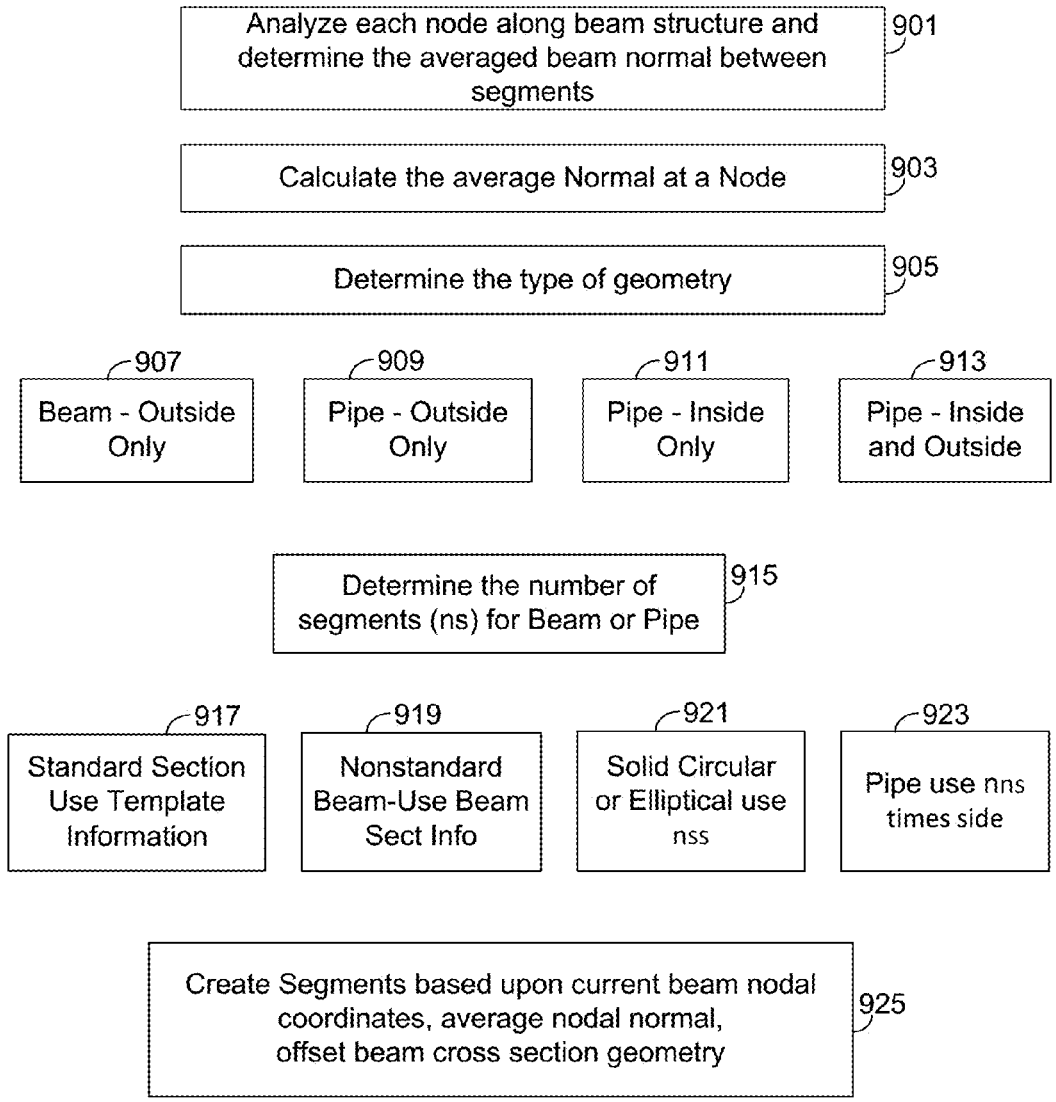
FIG. 9 is a flow diagram illustrating a process that may be implemented using a computer system with a processor coupled to a non-transitory storage medium in accordance with an exemplary embodiment.

FIG. 9 illustrates a process that may be implemented using a computer system with a processor coupled to a non-transitory storage medium. The process from FIG. 9 may be used when a beam is divided into a plurality of segments. At block 901, the process analyzes each node along a beam structure to determine the averaged beam normal between segments. At block 903, the process may calculate the average normal at each node for a segment.

The average Normal may be determined using the following equations:

$$V_{AVG}^{N} = \frac{1}{c}\sum_{t=1}^{c} V^{NE_t}$$

$V^{x_t}$ is the normal (direction cosine) at node N based upon element $E_1$, $V_{AVG}^{N}$ is the average normal at node N.

c is the number of elements that are associated with the node.

At block 905, the geometry of the beam may be determined. Next, a choice between blocks 907, 909, 911, and 913 may be made based on the model that is needed for the type of analysis. For example, when the object is determined to be a beam, the outside of the beam is segmented because the outside of the beam is used to determine contact with a beam at block 907. When the object is determined to be a pipe, the outside of the pipe may be segmented at block 909. In another embodiment, the inside of a pipe may be segmented because the contact analysis requires the inside of a pipe at block 911. At block 913, both the inside and the outside of the pipe may be segmented because they are relevant to the contact analysis.

At block 915, the number of segments for the beam or pipe may be determined. The number of segments for standard beam cross sections geometry may be determined using, for example, Table 1 below. Other ways of determining number of segments may be used as well.

TABLE 1

| Geometry | Number of segments |
|---|---|
| T-section | 8 |
| Channel section | 8 |
| L-Section | 6 |
| I-Section | 12 |
| Solid Rectangular | 4 |
| Solid Trapezoidal | 4 |
| Solid Circle | 36 |
| Pipe | 1 or 2 times number of segments |
| Solid Hexagonal | 8 |
| Solid Elliptical | 36 |

At block 917 the number of segments is determined based on table 1 above. When a nonstandard beam is detected, at block 919, the beam section information may be used. When a solid or elliptical circular beam is detected, the number of segments may be determined based on the circumference or diameter of the circular beam, at block 921. When the object is a pipe, the number of segments multiplied by the number of sides (inside and/or outside) may be used to generate the segments. At block 925, the number of determined segments may be created based on the beam nodal coordinates, average nodal normal, and offset beam cross section geometry.

Figure 10:
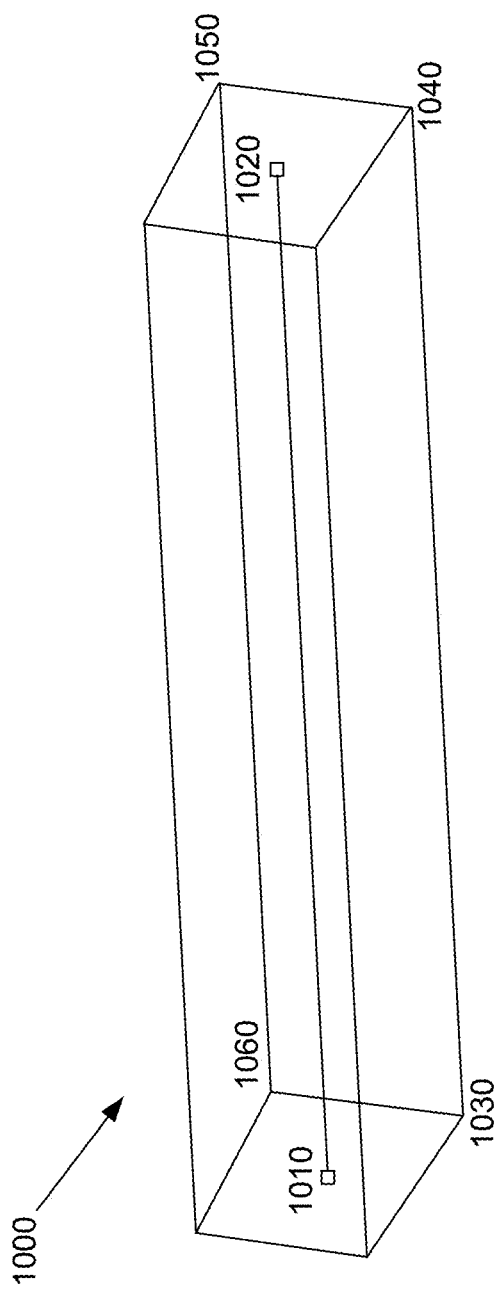
FIG. 10 is a schematic perspective view drawing showing a three dimensional square cross-section beam in expanded mode according to an example embodiment.

As an example for a square beam 1000 with no offset a typical segment is shown in FIG. 10. The segments are based upon the type of cross-section (shown as box). A typical segment is arbitrarily labeled 1030, 1040, 1050 and 1060. The labeling of the segment 1030, 1040, 1050 and 1060 using the right hand rule indicates the normal of the outward direction of the segment. Also shown in on beam 1000 are the two nodes 1010 and 1020.

Figure 11:
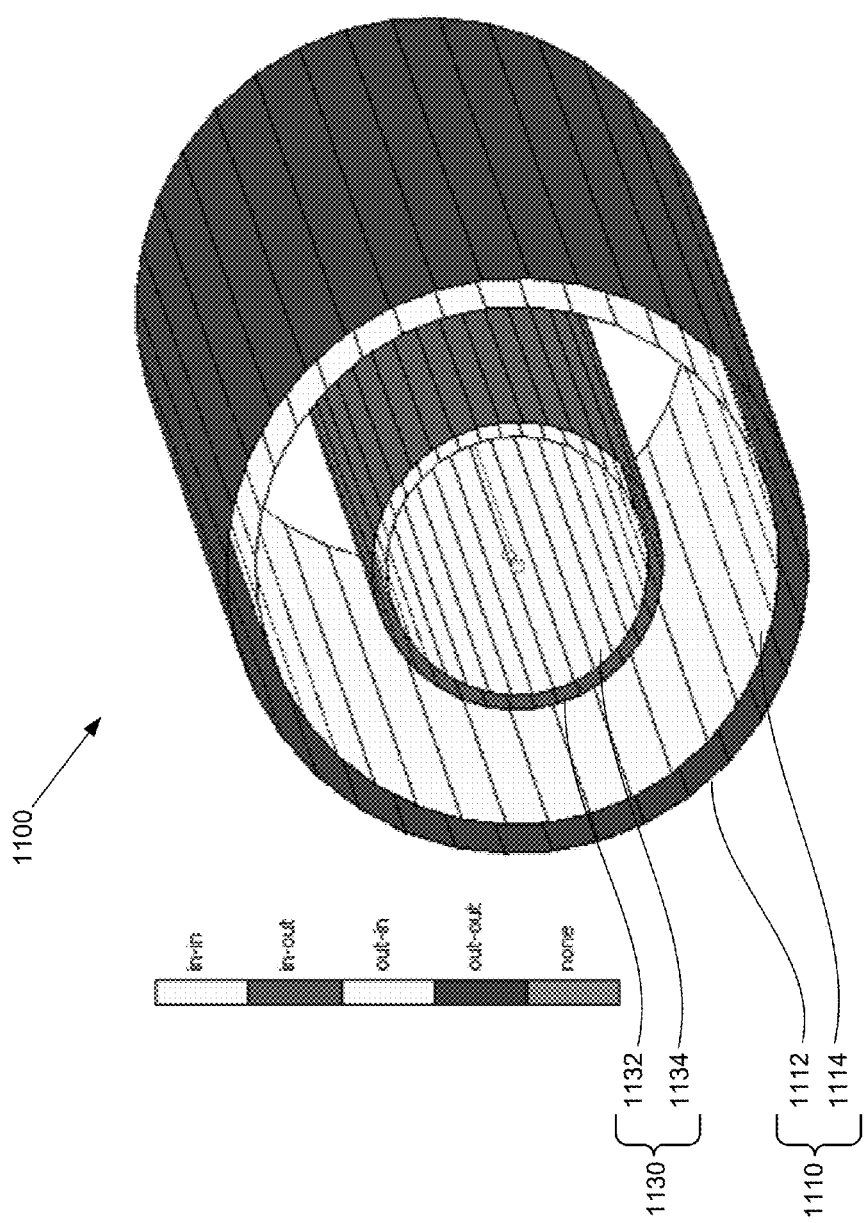
FIG. 11 is a schematic drawing illustrating a tube within a tube segmentation.
Figure 12:
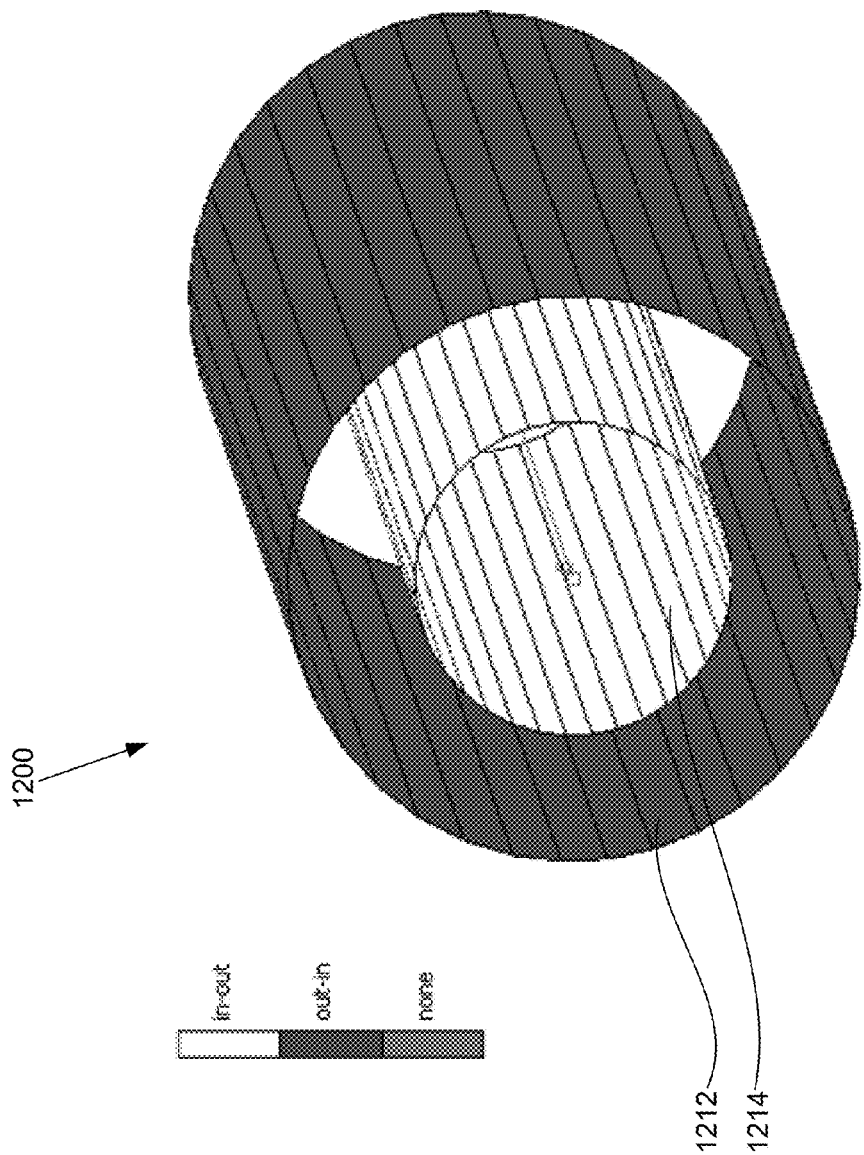
FIG. 12 is a schematic drawing illustrating a tube within a tube segmentation.

FIGS. 11 and 12 illustrate a tube 1130 within a tube 1110 contact analysis. A tube-in-tube analysis may require additional information to determine which side the contact occurs (inside or outside). For the expanded representation, an additional input to be provided may be when inner faces, outer faces or both faces are needed for the contact analysis. For determining content between a tube 1110 within a tube 1130, the outer face 1132 of the inside tube 1110 and the inner face 1114 of the outside tube 1110 may be segmented and analyzed. For beam to beam contact the outer faces of the beams will be segmented and analyzed. For determining contact of other shapes, both inner and outer faces of hollow beams may be segmented and analyzed. This is shown in FIGS. 11 and 12 where in FIG. 11, contact segments are created on the both the inner and outer surfaces of the pipe. However, in FIG. 12 segments are created on the outer surface of the inner tube 1214 and the inner surface of the outer tube 1212 because those are the only faces that will be in contact with each other when force is applied to the object as a whole.

Figure 13:
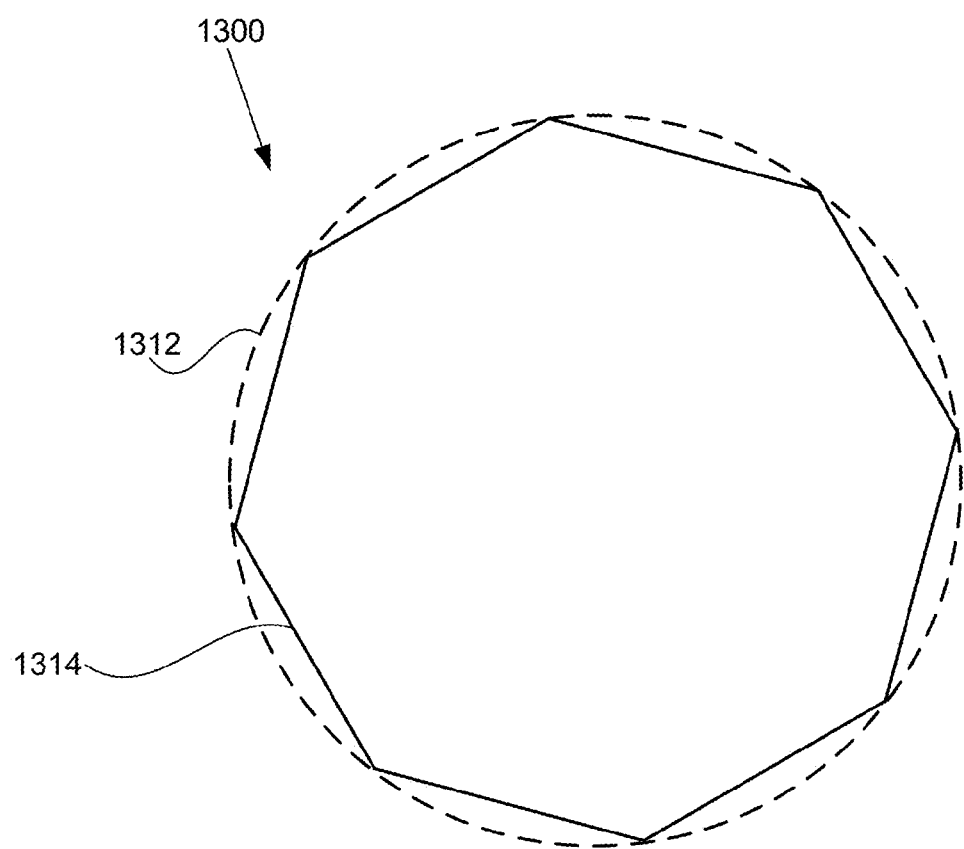
FIG. 13 is a schematic drawing illustrating Spline/Coons patch (dotted lines) representations of piece-wise linear segments (solid lines).

One may observe that for a circular beam or a curved pipe the segments are piecewise linear and hence do not exactly represent the curvature of the structure. This is relevant because the normal to the segment is used for the numerical calculations. To improve the accuracy of the calculation a cubic spline and/or Coons patches may be used based upon the coordinates of the corner points of the segment and the average normal at each corner point. As a circular pipe 1312 is represented by a quadratic surface, the Coons patches 1314 represent the geometry exactly as shown in FIG. 13.

Figure 14:
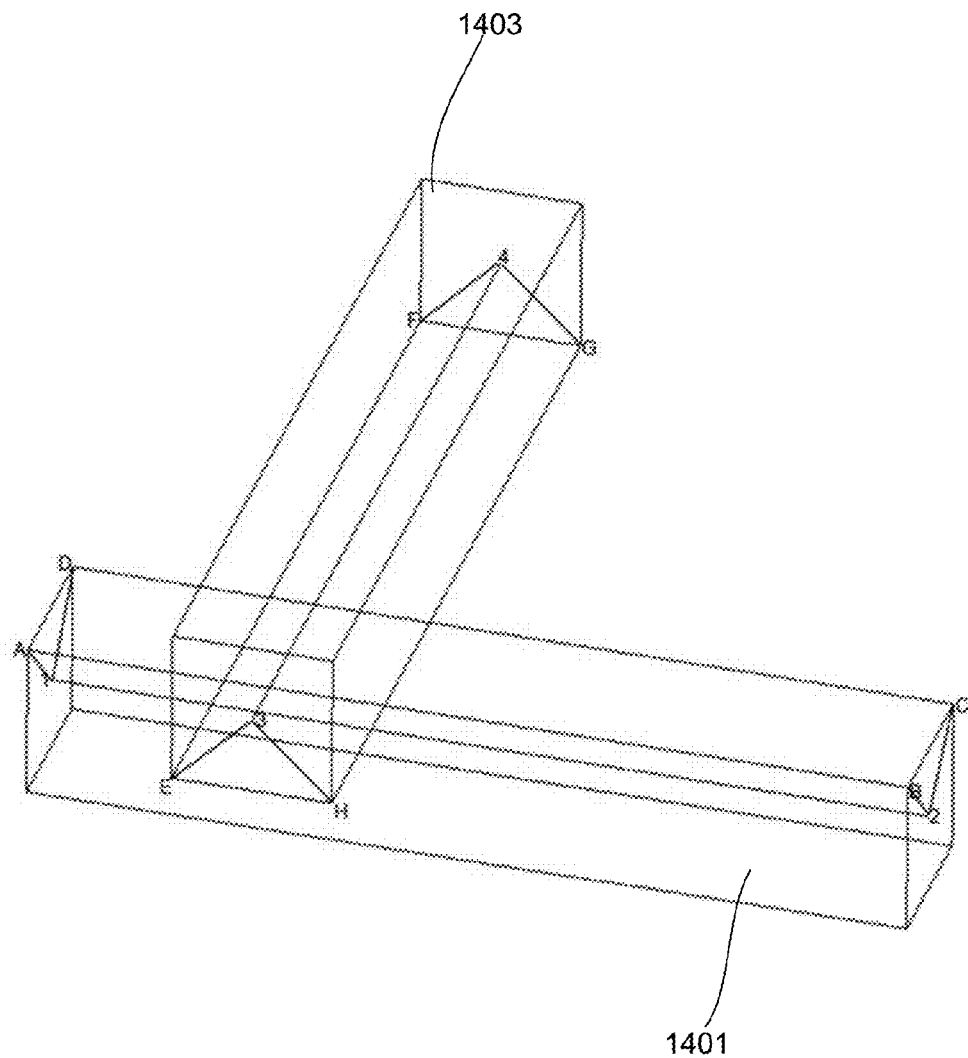
FIG. 14 is a schematic perspective view drawing illustrating two beams in contact with each other, where ABCD are segment points.

FIG. 14 shows two beams in contact with each other. In particular, beam 1401 and beam 1403 are in contact with each other. A typical segment of beam 1401 defined by segment points labeled as ABCD can be defined such that the original position is (X1+$V_A$), (X2+$V_B$), (X2+$V_C$), (X1+$V_D$) where X1, X2 are the nodal positions of the original beam nodes and $V_A$, $V_D$ are the vectors from node 1 to A and D, and $V_B$, $V_C$ are the vectors from node 2 to B and C.

Figure 15:
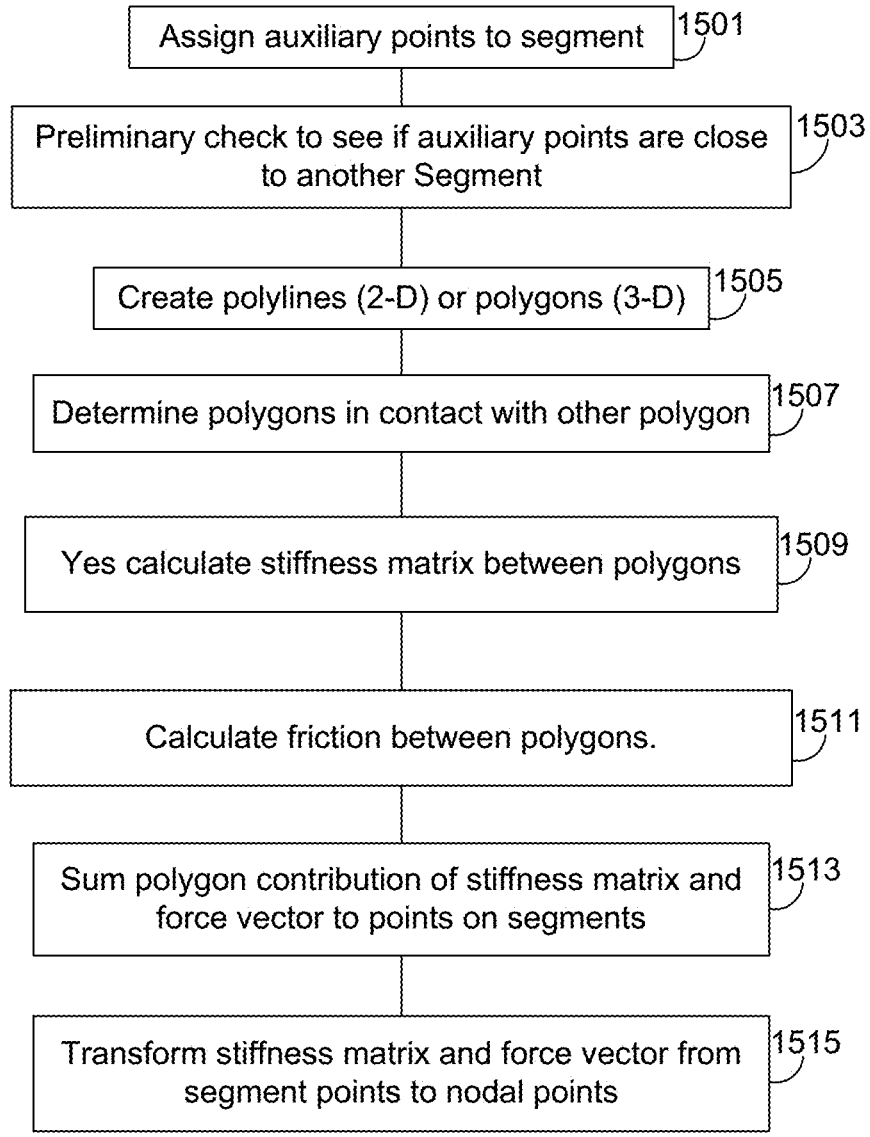
FIG. 15 is a flow diagram illustrating a process that is used to analyze contact between beams, pipes or other objects in accordance with an exemplary embodiment.

FIG. 15 shows a process that is used to analyze contact between beams, pipe or other objects. At step 1501, auxiliary points may be assigned to the segments shown in FIG. 16. In one embodiment, the auxiliary point may represent the corners of the segment or points that define the segment. At step 1503, distance between the auxiliary points of one segment compared to the auxiliary points of another segment is determined. At step 1505, polylines (for two dimensional) or polygons (for three dimensional) are created based on the projection of segments which are in close proximity with one another. At step 1507, a computer system may determine if one polygon is in contact with another polygon. When the polygons are in contact with each other, at step 1509, a stiffness matrix is calculated between the polygons that are in contact with each other. At step 1511 friction is detected between the two polygons. At step 1513, the polygon contribution of the stiffness matrix and force vectors to the segment points on the segment is calculated. An example method of calculating is discussed in greater detail below. At step 1515, the stiffness matrix and force vector are transformed from segment points to nodal points of the object using the Rigid Body Element, (RBE2) method.

The implementation of the contact algorithm is based upon amending the standard virtual work principal with two additional terms that govern the normal behavior and the tangential behavior, such that:

$$G(u, \delta u) + \int_\Gamma \lambda_n \delta g_n \, d\Gamma + \int_\Gamma l_t^T \delta g_t \, d\Gamma = 0$$

Where u is the displacement field, δu are kinematically admissible variations of this field, Γ is that part of boundary of the bodies being in contact and the subscript n is used to indicate the normal direction to the contact boundary, where the subscript t indicates the tangential direction. The function $g_n$ is called a gap function and expresses the distance between a point and its closest point projection on the contact boundary. The Lagrange multiplier $\lambda_n$ represents the contact normal stress. Similarly, $g_t$ is the tangential gap vector and $l_t$ is the tangential stress vector. The tangential or frictional behavior is assumed to be governed by the Coulomb's friction model utilizing the coefficient of friction t such that:

$$\phi = \|l_t\| - \mu \lambda_n \leq 0$$

If $g_n > 0$, a point is outside the contact boundary, if $g_n = 0$, a point is on the contact boundary and if $g_n < 0$, a point would be beyond the contact boundary, which is physically inadmissible.

φ<0 corresponds to sticking and φ=0 corresponds to slipping.

The finite element system is solved with the conventional Newton-Raphson method to achieve overall equilibrium and insure that the gap constraint is satisfied. Based on the iterative displacement solution obtained at iteration i, the following trial solutions for the Lagrange multipliers are introduced:

$$\lambda_n^{trial} = p_n^{i-1} + E_n g_n^i;$$

$$l_t^{trial} = t_t^{i-1} + E_t g_t^i$$

In the above equations $p_n$ and $t_t$ are fixed estimates of $\lambda_n$ and $l_t$, $E_n$ and $E_t$ are penalty factors for the contact behavior in the normal and tangential directions, and $g_n$ and $g_t$ follow from the global iterative displacement solution.

The auxiliary points discussed above basically define a local connection between two contact segments. Indicating such a point by a subscript i, the gap function $g_{ni}$ can be evaluated as the normal displacement difference between a point and its closest point projection on the contacted segment. Similarly, by looking at the tangential displacements, the gap function $g_{ti}$ can be evaluated. The displacement of a point on a contact segment is a function of the displacements and (in case of shell elements) rotations of the nodes corresponding to that segment. By collecting all the nodal displacement and rotation degrees of freedom in a vector U, the gap functions can be written as:

$$g_{ni} = (G_{1i}^T - G'_{ni}{}^T)U$$

$$g_{ti} = (G_{ti}^T - G'_{ti}{}^T)U$$

Here, vector $G_{ni}$ and matrix $G_{ti}$ express the dependency of the normal and tangential displacements of a point on a contact segment on the total set of degrees of freedom. In a similar way, $G'_{ni}$ and $G'_{ti}$ are used for the closest point projection of this point on the contacted segment.

It should be noted that, if applicable, these quantities also include the effect of the shell thickness and shell offset vectors. Using these expressions and conventional variational calculus the contribution to the force vector is given by:

$$\int_\Gamma \left(\frac{\partial g_n}{\partial u}\right)^T \lambda_n \, d\Gamma + \int_\Gamma \left(\frac{\partial g_t}{\partial u}\right)^T l_t \, d\Gamma = \sum_{i=1}^N (G_{ni} - G'_{ni})\lambda_{ni}\Delta\Gamma_i + \sum_{i=1}^N (G_{ti} - G'_{ti})l_{ti}\Delta\Gamma_i$$

In the above equation N is the total number of auxiliary points $\lambda_{ni}$ and $l_{ti}$ are the estimated contact normal and tangential stresses in auxiliary point i and $\Delta\Gamma_i$ is the area corresponding to this point.

For sticking contact, the contribution to the global stiffness matrix is:

$$\int_\Gamma \left(\frac{\partial g_n}{\partial u}\right)^T E_n \frac{\partial g_n}{\partial u} d\Gamma + \int_\Gamma \left(\frac{\partial g_t}{\partial u}\right)^T E_t \frac{\partial g_t}{\partial u} d\Gamma = \sum_{i=1}^N (G_{ni} - G'_{ni})E_{ni}(G_{ni}^T - G'_{ni}{}^T)\Delta\Gamma_i + \sum_{i=1}^N (G_{ti} - G'_{ti})E_{ti}(G_{ti}^T - G'_{ti}{}^T)\Delta\Gamma_i$$

For slipping contact the contribution to the global stiffness matrix is:

$$\int_\Gamma \left(\frac{\partial g_n}{\partial u}\right)^T E_n \frac{\partial g_n}{\partial u} d\Gamma + \int_\Gamma \left(\frac{\partial g_n}{\partial u}\right)^T \mu E_n \frac{l_t^T}{\|l_t\|} \frac{\partial g_t}{\partial u} d\Gamma +$$

$$\int_\Gamma \left(\frac{\partial g_t}{\partial u}\right)^T \frac{\mu \lambda_n}{\|l_t\|} E_t \begin{bmatrix} 1 - \frac{\lambda_{t1}^2}{\|l_t\|^2} & -\frac{\lambda_{t1}\lambda_{t2}}{\|l_t\|^2} \\ -\frac{\lambda_{t1}\lambda_{t2}}{\|l_t\|^2} & \frac{\lambda_{t2}^2}{\|l_t\|^2} \end{bmatrix} \frac{\partial g_t}{\partial u} d\Gamma =$$

$$\sum_{i=1}^N (G_{ni} - G'_{ni})E_{ni}(G_{ni}^T - G'_{ni}{}^T)\Delta\Gamma_i +$$

$$\sum_{i=1}^N (G_{ni} - G'_{ni})\mu E_{ni}\frac{l_{ti}^T}{\|l_{ti}\|}(G_{ti}^T - G'_{ti}{}^T)\Delta\Gamma_i +$$

-continued $$\sum_{i=1}^{N} (G_{ti} - G'_{ti}) \frac{\mu \lambda_n}{\|I_t\|} E_t \begin{bmatrix} 1 - \frac{\lambda_{t1i}^2}{\|I_{ti}\|^2} & \frac{-\lambda_{t1i}\lambda_{t2i}}{\|I_{ti}\|^2} \\ \frac{-\lambda_{t1i}\lambda_{t2i}}{\|I_{ti}\|^2} & 1 - \frac{\lambda_{t2i}^2}{\|I_{ti}\|^2} \end{bmatrix} (G_{ti}^T - G_{ti}'^T) \Delta \Gamma_i$$

During the simulation a deformation may occur due to an applied load, boundary conditions and contact conditions such that the coordinate position of nodes 1 and 2 are updated by the generalized nodal displacements (containing translations, rotations and other degrees of freedom as required) in the conventional manner such that $X1_{n+1} = X1_n + \Delta U1$. The subscript indicates time step n and $\Delta U$ is the incremental displacement of the step.

The updated coordinates of the segment points are governed by the multi-point constraint between nodes 1 and segment points A and D and the one constraint between node 2 and segment points B and C. The segment ABCD of beam 1 is checked at various time intervals steps in the analysis for contact with another beam patch, a shell patch, solid patch or a rigid body. A stiffness matrix will be formed between these polygons and included into the stiffness matrix associated with the segments. The stiffness matrix represents a generalized spring that acts between the incremental displacements of segment points A, B, C, D, E, F, G, and H and the incremental internal force on these nodes. This can be represented by the matrix equation.

$[K]^* \{du_A, du_B, du_C, du_D, du_E, du_F, du_G, du_H\} = \{f_A, f_B, f_C, f_D, f_E, f_F, f_G, f_H\}$

In the equation above $du_A$, $du_B$, $du_C$, $du_D$, $du_E$, $du_F$, $du_G$, and $du_H\}$ are the incremental displacements in global coordinate system of the segment points and $\{f_A, f_B, f_C, f_D, f_E, f_F, f_G, f_H\}$ is the internal forces. The stiffness matrix [K] and the force on segment A-B-C-D is transformed to beam nodes 1 and 2 and the stiffness and force associated with segment E-F-G-H are transformed to beam nodes 3 and 4 using the RBE2 constraint equations.

The result of the above calculations is that the stiffness matrix and force vector on the conventional finite element degrees of freedom of the nodes. The stiffness matrices and force vectors are summed together with other stiffness matrices and force vectors to be used in the finite element system. The solution is obtained using the conventional finite element methods to solve the linear set of equations. After stress recovery and calculation of the forces one will obtain the desired solution. The solution includes an accurate determination of the displacement of the beams and/or pipes and the location of the contact. The displacement of the segments is obtained based upon the displacement of the nodes and the geometric information. The solution also includes contact forces between the beams and/or pipes with other beams and/or pipes or other deformable or rigid bodies. The solution may include the Contact stresses between the beams and/or pipes with other beams and/or pipes or other deformable or rigid bodies. These quantities are obtained based upon the relative displacement of the segments, the stiffness matrix and the area of the segments.

The derivation in discussed above is not limited to structural displacements, displacements and forces, but may be equally applied to other physical mechanisms such as but not limited to heat transfer, diffusion and electromagnetic analysis. In such problems the variable "u" referred to as displacement now refers to a generalized quantity such as temperature, the variable "K" referred to as stiffness matrix is a generalized operator and the variable "f" is a generalized load such as flux. For a heat transfer problem, this stiffness matrix may include the effects of conduction, convection and radiation.

Figure 16:
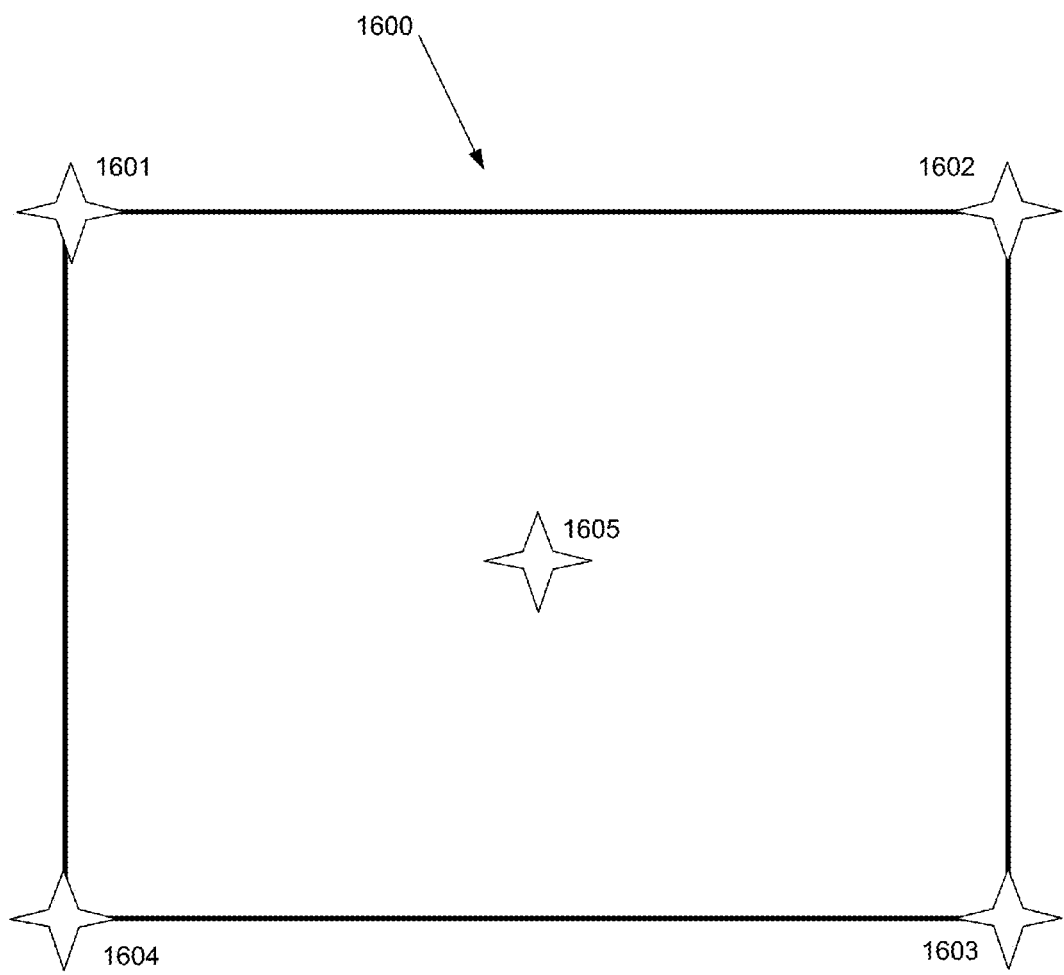
FIG. 16 is a schematic drawing showing auxiliary point locations on a segment.

FIG. 16 is a schematic drawing showing auxiliary points 1601, 1602, 1603, 1604 and 1605 on a segment 1600. As shown in FIG. 16 the example segment has 4 corners 1601, 1602, 1603, 1604 and a center 1605. In the case where the segment is circular, the segment may have a center auxiliary point and an auxiliary point at the diameter.

Figure 17:
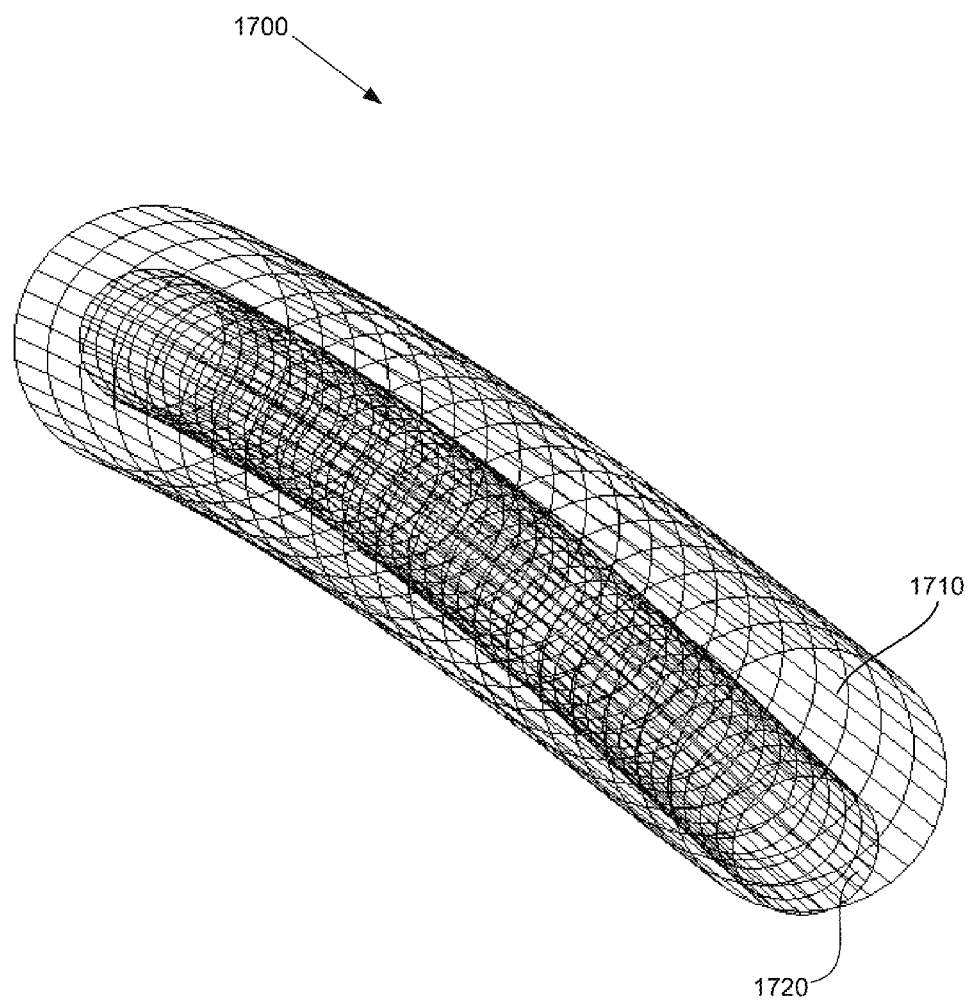
FIG. 17 is a schematic drawing showing a pipe in pipe deformation.
Figure 18:
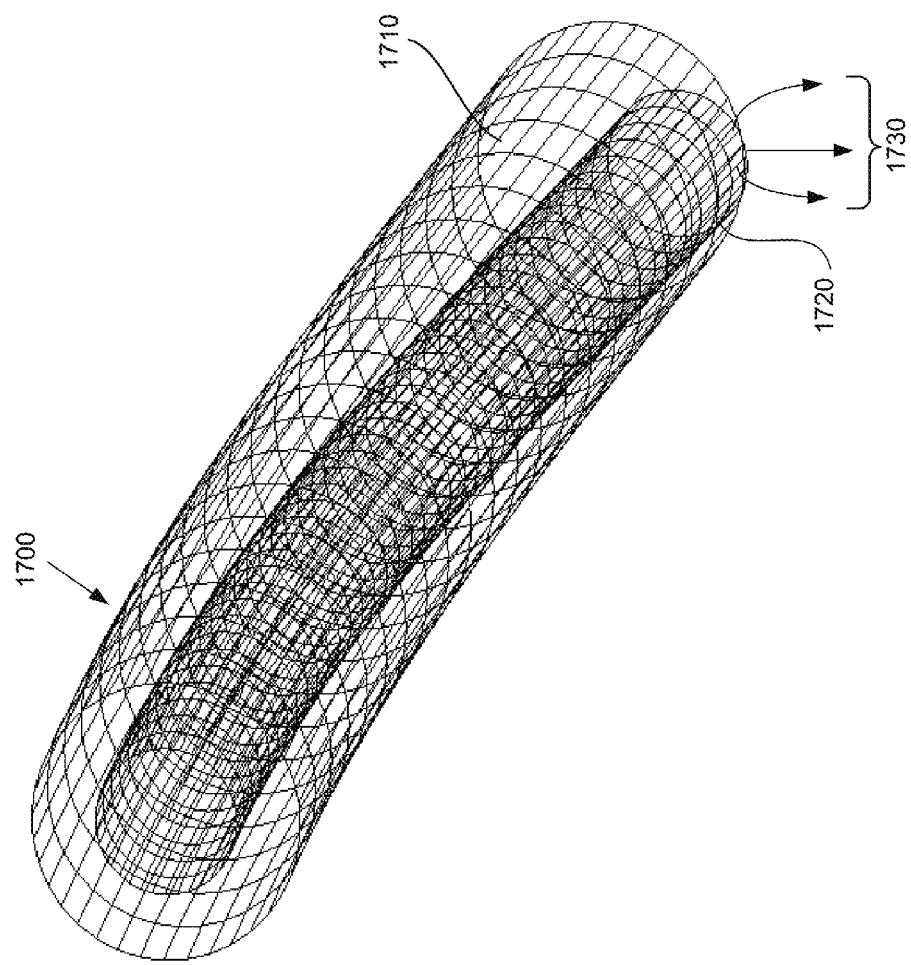
FIG. 18 is a schematic drawing illustrating the contact force between pipes on contacting segments.
Figure 19:
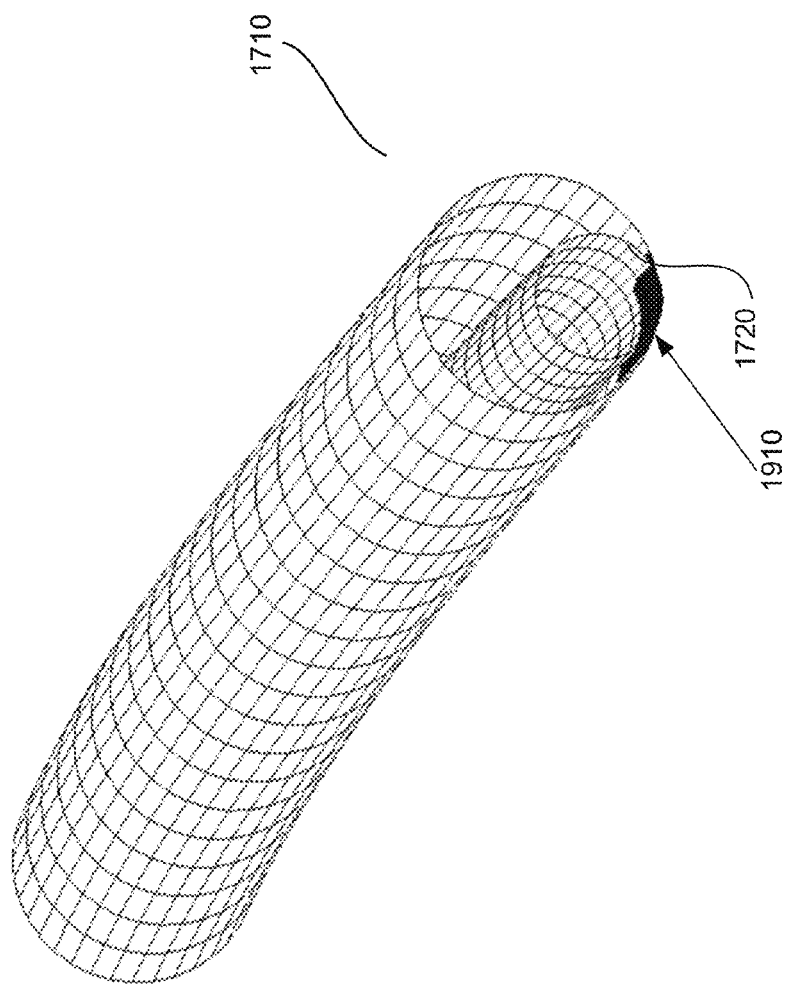
FIG. 19 is a schematic drawing illustrating the contact region of the contacting segments from FIG. 18.

To further demonstrate the above concepts a large deformation pipe in pipe simulation is shown in FIG. 17. Each pipe 1710 and 1720 is constructed out of 20 beams with a pipe cross section. A load is applied to the inner pipe at one end and the pipes are clamped on the other end. The deformed mesh of the pipe-in-pipe object 1700 is shown in FIG. 17. Also shown in FIG. 18 are the nodal force vectors 1730 from the contact and deformations. In one embodiment, the region of contact 1910 may be displayed in a different color as shown in FIG. 19. In another implementation, the color of the region of contact 1910 may be adjusted to show the amount of force being exerted or the amount of friction between the two pipes.

Figure 20:
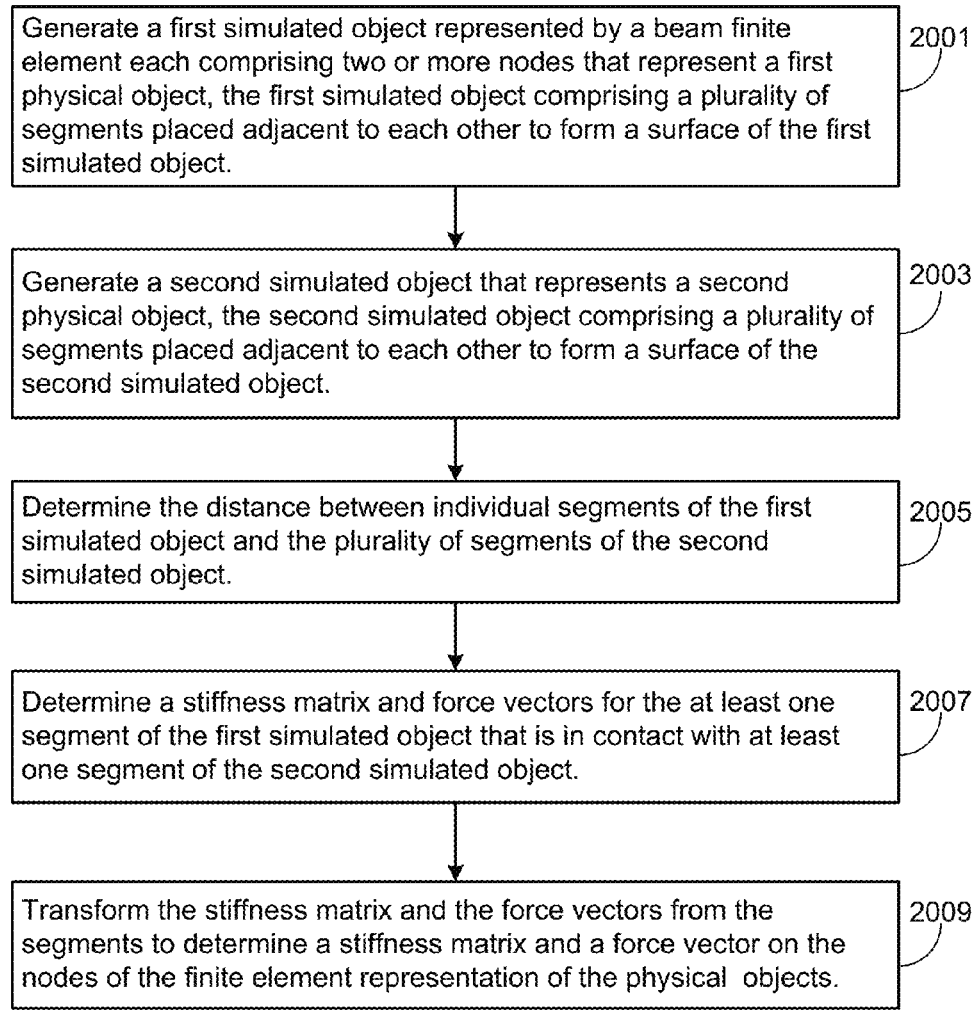
FIG. 20 is a flow diagram illustrating an exemplary process that may performed by a computer system with a process tied to a non-transitory machine readable storage medium in accordance with an exemplary embodiment.

FIG. 20 is an example process that may performed by a computer system with a process tied to a non-transitory machine readable storage medium. The process includes steps 2001 to 2009. At step 2001, the system generates a first simulated object represented by a beam finite element each comprising two or more nodes that represent a first physical object, the first simulated object comprising a plurality of segments placed adjacent to each other to form a surface of the first simulated object. Next at step 2003, the system generate a second simulated object that represents a second physical object, the second simulated object comprising a plurality of segments placed adjacent to each other to form a surface of the second simulated object. Next at step 2005, the processor may determine the distance between individual segments of the first simulated object and the plurality of segments of the second simulated object. At step 2007, the system may determine a stiffness matrix and force vectors for the at least one segment of the first simulated object that is in contact with at least one segment of the second simulated object. At step 2009, the system may transform the stiffness matrix and the force vectors from the segments to determine a stiffness matrix and a force vector on the nodes of the finite element representation of the physical objects.

Figure 21:
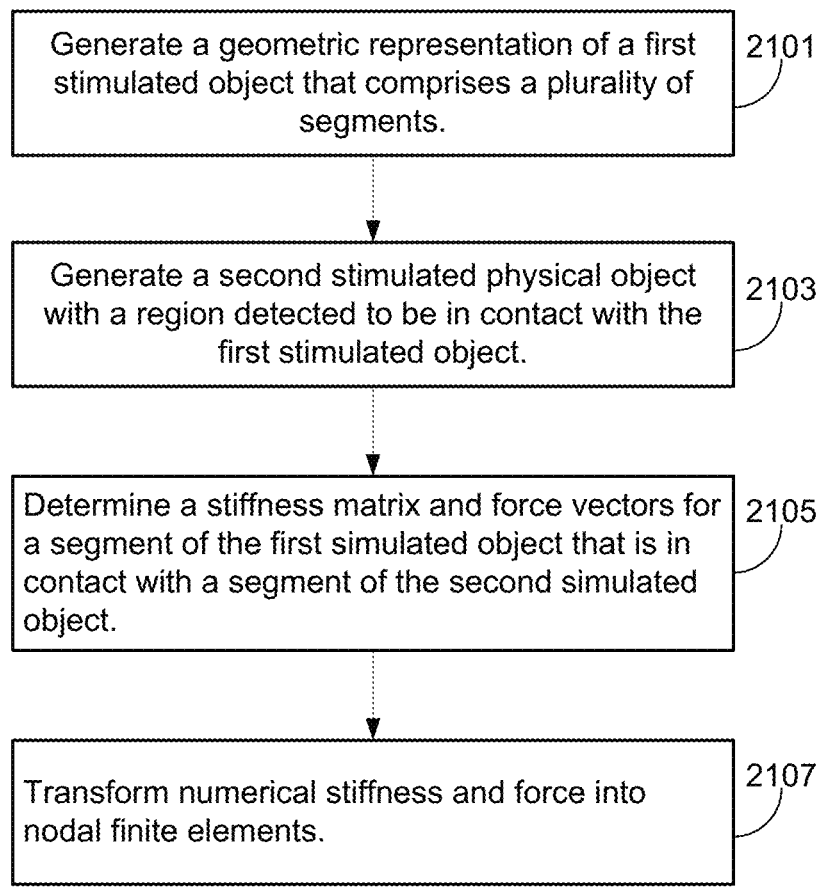
FIG. 21 is a flow diagram of another exemplary process that may be implemented on a computer system with a process tied to a non-transitory machine readable storage medium in accordance with an exemplary embodiment.

FIG. 21 is another example process that may is implemented on a computer system with a process tied to a non-transitory machine readable storage medium. At step 2101, the system generates a geometric representation of a first stimulated object that comprises a plurality of segments. At step 2103, the system may generate a second stimulated physical object with a region detected to be in contact with the first stimulated object. At step 2105, the system determines a stiffness matrix and force vectors for a segment of the first simulated object that is in contact with a segment of the second simulated object. At step 2107, the numerical stiffness and force is transformed into nodal finite element representations.

Referring to FIG. 22, FIG. 22 is a schematic diagram of a data processing system 2200 according to an embodiment. System 2200 includes a user input device 2202, CAD/CAE system 2210, display device 2220, processor 2230 and storage device 2240. The system 2200 may include other devices such as network logic, wireless communication, printer and other known devices.

The input device 2202 as described herein may include a computer with a monitor, keyboard, keypad, mouse, joystick or other input devices performing a similar function. The input device 2202 may include a keyboard including alphanumeric and other keys, and may be coupled to the bus for communicating information and command selections to the processor 2230. In one embodiment, the input device 2202 has a touch screen interface or movement sensing interface that may be combined with, or separated from, display device 2220. The input device 2202 can include a cursor control device, such as a mouse, trackball, touch screen, motion sensor or cursor direction keys, for communicating direction information and command selections to the processor 2230 and for controlling cursor movement on the display device 2220.

The CAD/CAE system 2210 is a computer system that is in communication with the input device 2202, display device 2220, processor 2230 and storage device 2240. In one implementation, the CAD/CAE system 2210 may be stored on a non-transitory storage medium that is at the same location as the user input device 2202. In another implementation, the CAD/CAE system 2210 may be located in a different location than the input device 2201. For example, the CAD/CAE system 2210 may communicate with the input device 2202 through a network or wirelessly. Accordingly, the CAD/CAE system 2210 may be a cloud-based system that provides software as a service. In another embodiment, the CAD/CAE system 2210 may include the processor 2230 and the storage device 2240.

The processor 2230 may be configured to receive instructions from the input device 2202 and CAD/CAE system 2210. For example, the instructions may request the processor 2230 to create segments in 2212, calculate the distance between two auxiliary points in 2215 and/or create stiffness matrices in 2216. The processor 2230 is configured to receive data from and calculate results for each of the logics within the CAD/CAE system 2210. The processor 2230 may be, but is not limited to being, an Intel® designed processor, AMD® designed processor, Apple® designed processor, QUALCOMM® designed processor, or ARM® designed process.

The storage device 2240 may include a memory such as a random access memory (RAM) or other dynamic storage devices. In another implementation, the storage device 2240 may also include non-transitory storage media that is configured to store information regarding the geometric model and the finite element model that is being currently modified or was created in the past. The storage device 2240 may send or receive data to or from the processor 2230 and each of the other systems in the system 2210. For example, the storage device 2240 may be configured to communicate with the input device 2202, CAD/CAE system 2210 and display device 2220. In one embodiment, the storage device 2240 may be a remote storage device that stores the CAD/CAE system 2210 data in a different location than the input device 2202 or the CAD system 2210. In another embodiment, the storage device 2240 may be located on the same computer system as the input device 2202 and/or the CAD/CAE system 2210.

The CAD/CAE system 2210 is configured to provide a user with the functionality described below with respect to FIG. 1 through 21. The CAD/CAE system 2210 includes a segmentation computer 2212, distance determination computer 2215, and stiffness matrix determination computer 2216. The CAD/CAE system 2210 may receive the geometric model information either from the user or from the storage device 2240. In some implementations, a third party may provide the model information. Upon receiving the model information, the CAD/CAE system 2210 may display the geometric model on the display device 2220. A user may choose to edit the objects within a geometric model. The objects may have vertices and edges that connect the vertices.

The segmentation computer 2212 is configured to determine segments based on the shape of the simulated object. The segmentation computer 2212 may determine the number of segments as discussed above with respect to FIGS. 1 through 21. Computer 2212 can be embodied as a module of software operating on one or more computer platforms.

The distance determination computer 2215 calculates the distance between a plurality of segments. In one embodiment, the distance determination computer 2215 determines the distance between an auxiliary point on a segment with auxiliary points of the opposing object on a continuous basis. In another embodiment, the distance determination computer 2215 warns the user that two objects are close enough to contact each other. Computer 2215 can be embodied as a module of software operating on one or more computer platforms.

The stiffness matrix determination computer 2216 may calculate a stiffness matrix based on the output determined by the distance determination computer 2215 as discuss above with respect to FIG. 1 through 21. Computer 2216 can be embodied as a module of software operating on one or more computer platforms.

The detailed description set forth above in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "logic", "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, while certain embodiments have been described with respect to searching of a single media type, i.e., image search or video search, one or more embodiments are also relevant to a generic search where the search results are blended with different media types. Thus, for example, a user can type in a keyword search phrase into an Internet search engine and obtains results that contain images, video and other media types blended with text results, and in which relevant matching advertisements are obtained (and provided to the user) that match one or more of these multi-media search results. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    generating a first simulated object, in a computer system, represented by line finite elements each comprising two or more nodes that represent a first physical object, the first simulated object comprising a plurality of segments placed adjacent to each other to form a surface of the first simulated object;
    generating a second simulated object that represents a second physical object, the second simulated object comprising a plurality of segments placed adjacent to each other to form a surface of the second simulated object;
    determining a distance between individual segments of the first simulated object and the plurality of segments of either the first or the second simulated object;
    determining a stiffness matrix for at least one segment of the first simulated object that is in contact with at least one segment of the second simulated object when the at least one segment of the first simulated object is in contact with the at least one segment of the second simulated object;
    determining a force vector for the at least one segment of the first simulated object that is in contact with at least one segment of the second simulated object when the at least one segment of the first simulated object is in contact with the at least one segment of the second simulated object; and
    converting the stiffness matrix and the force vector from the at least one segment of the first simulated object and the at least one segment of the second simulated object to determine a stiffness matrix and a force vector on the two or more nodes of the line finite element representation of the first and second physical objects.

2. The method of claim 1, wherein the surface has inner segments or outer segments of the first simulated object.

3. The method of claim 1, wherein the surface has inner segments or outer segments of the second simulated object.

4. The method of claim 1, wherein the first physical object is any one of a beam or pipe; and the segments represent any arbitrary beam or pipe cross section.

5. The method of claim 1, further comprising continuously monitoring the distance between an auxiliary point on the segment of the first simulated object and the segment of the second simulated object.

6. The method of claim 1, wherein a beam or pipe is represented by multiple segments and the geometric distance between auxiliary points on these segments and other segments are used to determine proximity.

7. The method of claim 1, wherein the segments are represented by splines or Coons surfaces to ensure that smooth beams or pipes interact with the second simulated object without introducing artificial constraints or loads.

8. The method of claim 1, further comprising determining a predicted force when the first simulated object and the second simulated object are in contact with each other.

9. The method of claim 1, wherein a thermal flux transfer is predicted between the two simulated objects using the segments.

10. The method of claim 1, wherein the at least one segment of the first simulated object is determined to be in contact with the at least one segment of the second simulated object based on the distance determined.

11. A system, comprising a computer processor, operably coupled to a non-transitory memory storing computer executable instructions that, when executed by the processor:
    configure a CAD computer system to generate a first simulated object represented by line finite elements each comprising two or more nodes that represent a first physical object, the first simulated object comprising a plurality of segments placed adjacent to each other to form a surface of the first simulated object;
    configure the CAD computer system to generate a second simulated object that represents a second physical object, the second simulated object comprising a plurality of segments placed adjacent to each other to form a surface of the second simulated object;
    configure a distance determiner to determine the distance between individual segments of the first simulated object and the plurality of segments of either the first or the second simulated object;
    configure a stiffness matrix determiner to determine a stiffness matrix for at least one segment of the first simulated object that is in contact with at least one segment of the second simulated object when the at least one segment of the first simulated object is in contact with the at least one segment of the second simulated object;
    configure the stiffness matrix determiner to determine a force vector for the at least one segment of the first simulated object that is in contact with at least one segment of the second simulated object when the at least one segment of the first simulated object is in contact with the at least one segment of the second simulated object; and configure the CAD system to convert the stiffness matrix and the force vector from the at least one segment of the first simulated object and the at least one segment of the second simulated object to determine a stiffness matrix and a force vector for the two or more nodes of the line finite element representation of the physical objects.

12. The system of claim 11, wherein the processor is configured to generate a surface that has inner segments or outer segments of the first simulated object.

13. The system of claim 11, wherein the processor is configured to generate the surface with inner segments or outer segments of the second simulated object.

14. The system of claim 11, wherein the first physical object is any one of a beam or pipe; and the segments represent any arbitrary beam or pipe cross section.

15. The system of claim 11, wherein the distance determiner is configured to periodically or continuously monitor the distance between an auxiliary point on the segment of the first simulated object and the segment of the second simulated object.

16. The system of claim 11, wherein the first and second physical object is a beam or pipe represented by multiple segments and the geometric distance between auxiliary points on the segments and other segments are used to determine proximity by the distance determiner.

17. The system of claim 11, wherein the segments are represented by splines or Coons surfaces to insure that smooth beams or pipes interact with the secondary object without introducing artificial constraints or loads.

18. The system of claim 11, wherein the CAD computer system is configured to determine a predicted force when the first simulated object and the second simulated object when the objects contact each other.

19. The system of claim 11, wherein the CAD computer system is configured to predict the heat transfer to predict a thermal flux between objects.

20. An apparatus, comprising:

a processor coupled to a computer-implemented storage medium, the processor configured to:

generate a first simulated object, in a computer system, represented by line finite elements each comprising two or more nodes that represent a first physical object, the first simulated object comprising a plurality of segments placed adjacent to each other to form a surface of the first simulated object;

generate a second simulated object that represents a second physical object, the second simulated object comprising a plurality of segments placed adjacent to each other to form a surface of the second simulated object;

determine a distance between individual segments of the first simulated object and the plurality of segments of either the first or the second simulated object;

determine a stiffness matrix for at least one segment of the first simulated object that is in contact with at least one segment of the second simulated object when the at least one segment of the first simulated object is in contact with the at least one segment of the second simulated object;

determine a force vector for the at least one segment of the first simulated object that is in contact with at least one segment of the second simulated object when the at least one segment of the first simulated object is in contact with the at least one segment of the second simulated object; and convert the stiffness matrix and the force vector from the at least one segment of the first simulated object and the at least one segment of the second simulated object to determine a stiffness matrix and a force vector on the two or more nodes of the line finite element representation of the first and second physical objects.

* * * * *